United States Patent
Zhang et al.

(10) Patent No.: US 12,498,813 B2
(45) Date of Patent: Dec. 16, 2025

(54) METHOD AND ELECTRONIC DEVICE FOR CONTROLLING A DISPLAY TO TURN ON OR OFF

(71) Applicant: HONOR DEVICE CO., LTD., Shenzhen (CN)

(72) Inventors: Zhen Zhang, Shenzhen (CN); Xiaolong Ren, Shenzhen (CN); Yongbao Yue, Shenzhen (CN); Xiaoyong Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 141 days.

(21) Appl. No.: 17/790,733

(22) PCT Filed: Jan. 18, 2022

(86) PCT No.: PCT/CN2022/072601
§ 371 (c)(1),
(2) Date: Jul. 3, 2022

(87) PCT Pub. No.: WO2022/242211
PCT Pub. Date: Nov. 24, 2022

(65) Prior Publication Data
US 2024/0168582 A1    May 23, 2024

(30) Foreign Application Priority Data

May 21, 2021  (CN) .......................... 202110560597.5

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04108* (2013.01)

(58) Field of Classification Search
CPC ..................................................... G06F 3/0416
See application file for complete search history.

(56) References Cited

U.S. PATENT DOCUMENTS

| 9,652,091 B1* | 5/2017 | Obeidat | G06F 3/0416 |
| 2011/0291988 A1* | 12/2011 | Bamji | G06F 3/0421 |
| | | | 345/175 |

(Continued)

FOREIGN PATENT DOCUMENTS

| CN | 107046601 A | 8/2017 |
| CN | 108304061 A | 7/2018 |

(Continued)

*Primary Examiner* — William Boddie
*Assistant Examiner* — Andrew B Schnirel
(74) *Attorney, Agent, or Firm* — WOMBLE BOND DICKINSON (US) LLP

(57) ABSTRACT

A display control method comprises obtaining capacitance values of a detection region of a touch panel, where a location point at which a difference between a capacitance value in the detection region and a first value exceeds a first preset threshold is a contact region, and a location point at which a difference between a capacitance value in the detection region and the first value does not exceed the first preset threshold is a contactless region. When the contact region meets a first predetermined condition or the contactless region meets a second predetermined condition, controlling the display to turn off. When the contactless region does not meet the second predetermined condition or the contact region does not meet the first predetermined condition, controlling the display to turn on. The whole process is not easily to be interfered with by external magnetic fields.

20 Claims, 9 Drawing Sheets

Obtain a first region when it is detected that a capacitance value of a display changes — S101

Determine, based on the first region, whether a B-shell surface is fastened to a C-shell surface — S102

When it is determined that the B-shell surface is fastened to the C-shell surface, control the display to turn off — S103

(56) References Cited

U.S. PATENT DOCUMENTS

| | | | | |
|---|---|---|---|---|
| 2012/0115501 A1* | 5/2012 | Zheng | ............... | G06F 3/04842 |
| | | | | 455/456.1 |
| 2012/0235963 A1* | 9/2012 | Oshinome | ............... | G06F 3/041 |
| | | | | 345/204 |
| 2015/0185866 A1* | 7/2015 | Im | ............... | G06F 1/1677 |
| | | | | 345/168 |
| 2016/0085319 A1* | 3/2016 | Kim | ............... | H04M 1/0268 |
| | | | | 345/156 |
| 2016/0334926 A1 | 11/2016 | Gan et al. | | |
| 2019/0258289 A1* | 8/2019 | Asahara | ............... | G06F 3/03547 |
| 2019/0278339 A1 | 9/2019 | Cooper et al. | | |
| 2019/0324574 A1* | 10/2019 | Schooley | ............... | G06F 1/1632 |
| 2020/0374386 A1* | 11/2020 | Xu | ............... | H04N 23/651 |
| 2021/0132769 A1 | 5/2021 | Parikh et al. | | |

FOREIGN PATENT DOCUMENTS

| | | |
|---|---|---|
| CN | 109257505 A | 1/2019 |
| CN | 110660329 A | 1/2020 |
| CN | 112817512 A | 5/2021 |
| WO | 2020155876 A1 | 8/2020 |

\* cited by examiner

METHOD AND ELECTRONIC DEVICE FOR CONTROLLING A DISPLAY TO TURN ON OR OFF

CROSS-REFERENCE TO RELATED APPLICATIONS

This application is a National Stage of International Application No. PCT/CN2022/072601, filed on Jan. 18, 2022, which claims priority to Chinese Patent Application No. 202110560597.5, filed on May 21, 2021. The disclosures of which are incorporated herein by reference in their entireties.

TECHNICAL FIELD

Embodiments of this application relate to the field of electronic technologies, and in particular, to a display control method and an electronic device.

BACKGROUND

With development of terminal devices, more terminal devices are configured with displays. The display becomes a main energy consumption component on the terminal device. For a terminal device with a shielding cover, it is an ideal screen control effect to implement screen on upon opening of the shielding cover and screen off upon closing of the shielding cover.

In a related art, a Hall effect sensor is usually used to detect whether a display is fastened to a shielding cover, and control the screen to be turned on/off based on a detection result. However, in a strong magnetic field environment, the Hall effect sensor is prone to failure, thereby causing failure of screen on/off control.

SUMMARY

This application provides a display control method and an electronic device, to determine, based on a change in a capacitance value on a touch panel of a display, whether the display is fastened to a shielding cover, so as to control on and off of the display, and avoid incorrect control of the display.

The following technical solutions are used in this application.

According to a first aspect, an embodiment of this application provides a display control method, applied to an electronic device including a display, where the display includes a touch panel. The method includes: obtaining capacitance values of a detection region of the touch panel, where a location point at which a difference between a capacitance value in the detection region and a first value exceeds a first preset threshold is a contact region, and a location point at which a difference between a capacitance value in the detection region and the first value does not exceed the first preset threshold is a contactless region; and when the contact region meets a first predetermined condition or the contactless region meets a second predetermined condition, controlling the display to turn off; or when the contactless region does not meet the second predetermined condition or the contact region does not meet the first predetermined condition, controlling the display to turn on.

It may be understood that a capacitance value increases when the touch panel is in floating contact with a conductor.

Therefore, in some embodiments, the contact region with floating contact and the contactless region without contact on the panel are determined based on a capacitance value of the touch panel. When the panel is in floating contact in a large area, the display may be blocked. Therefore, the foregoing contact region may be used to evaluate whether the display is blocked. Similarly, the contactless region may also be used to evaluate whether the display is blocked. Therefore, in this embodiment of this application, the contact region (or the contactless region) may be used to determine and control when the display is on and when the display is off. In addition, the entire determining process is not susceptible to interference from an external magnetic field, and a problem that the display is incorrectly controlled is avoided.

For example, when the contact region meets the first predetermined condition, the display may be controlled to turn off; when the contactless region does not meet the second predetermined condition, the display is controlled to turn on.

For another example, when the contact region meets the first predetermined condition, the display may be controlled to turn off; when the contact region does not meet the first predetermined condition, the display is controlled to turn on.

For another example, when the contactless region meets the second predetermined condition, the display may be controlled to turn off; when the contactless region does not meet the second predetermined condition, the display is controlled to turn on.

For another example, when the contactless region meets the second predetermined condition, the display may be controlled to turn off; when the contact region does not meet the first predetermined condition, the display is controlled to turn on.

With reference to the first aspect, in a possible design manner, the first predetermined condition includes one or a combination of more of the following: An area ratio of the contact region to the detection region exceeds a first ratio; a capacitance value corresponding to the contact region is not less than a capacitance threshold; and existence duration of the contact region exceeds preset duration.

For example, the first predetermined condition may be that the area ratio of the contact region to the detection region exceeds the first ratio. A large-area floating contact and a single-point floating contact are distinguished by using the first predetermined condition. This avoids false control of the display when a hand touches the display.

For another example, the first predetermined condition may be that the capacitance value corresponding to the contact region is not less than the capacitance threshold. Two scenarios of "the hand touches the display" and "a metal shielding surface is fastened to the display" are distinguished by using a characteristic that capacitance value changes due to floating contact of conductors of different types of materials on the touch panel are different. This avoids incorrectly controlling the display to turn off when a hand touches the display.

For another example, the first predetermined condition may be that the existence duration of the contact region exceeds the preset duration. According to a feature that fastening between the shielding surface and the display is a long-term floating contact, accuracy of identifying fastening between the shielding surface and the display is improved, and therefore accuracy of controlling the display is improved.

For another example, the foregoing first predetermined condition may include a combination of multiple determining conditions, for example, the area ratio of the contact region to the detection region exceeds the first ratio, and the capacitance value corresponding to the contact region is not less than the capacitance threshold. For another example, the capacitance value corresponding to the contact region is not less than the capacitance threshold, and the existence duration of the contact region exceeds the preset duration. For another example, the area ratio of the contact region to the detection region exceeds the first ratio, and the existence duration of the contact region exceeds the preset duration. For another example, the area ratio of the contact region to the detection region exceeds the first ratio, the capacitance value corresponding to the contact region is not less than the capacitance threshold, and the existence duration of the contact region exceeds the preset duration.

It may be understood that, in a case in which the first predetermined condition includes a combination of multiple determining conditions, the contact region needs to meet each determining condition, so that the contact region can meet the first predetermined condition. However, when the contact region does not meet any determining condition, it is determined that the contact region does not meet the first predetermined condition.

With reference to the first aspect, in a possible design manner, the second predetermined condition includes: An area ratio of the contactless region to the detection region does not exceed a first ratio.

With reference to the first aspect, in a possible design manner, the detection region is all or a part of the touch panel.

When the detection region is a part of the touch panel, energy consumption generated by refreshing the capacitance value of the electronic device can be effectively reduced.

When the detection region is all the touch panel, accuracy of controlling the display to turn on/off is improved.

With reference to the first aspect, in a possible design manner, after the controlling the display to turn off, the method further includes: obtaining a capacitance value of the detection region by using a first frame rate, where the first frame rate is lower than a second frame rate, and the second frame rate is a refresh frame rate of the touch panel when the display is on. Therefore, energy consumption of the electronic device is reduced.

With reference to the first aspect, in a possible design manner, after the controlling the display to turn off, the method further includes: suspending detection of a capacitance value of the touch panel within a first time period, where the first time period is a time period between a moment at which the display turns off and a moment of receiving a first operation of a user. Therefore, it can be identified, in a timely manner, that the user expects the display to be on, and energy consumption of the electronic device is reduced.

With reference to the first aspect, in a possible design manner, the electronic device includes a microphone. The method includes: collecting ambient sound data by using the microphone; when the ambient sound data is a cover opening sound of the electronic device, determining that the first operation is received; and when it is determined that the first operation is received, continuing to detect a capacitance value of the detection region.

With reference to the first aspect, in a possible design manner, the method includes: when the display is on, controlling the microphone to stop collecting the ambient sound data; and when the display changes from on to off, controlling the microphone to continue to collect the ambient sound data. Therefore, energy consumption of the electronic device is reduced.

With reference to the first aspect, in a possible design manner, the electronic device includes an upper cover and an acceleration sensor. The acceleration sensor is disposed on the upper cover. The method includes: collecting a real-time acceleration value of the upper cover by using the acceleration sensor; when the real-time acceleration value indicates that a motion track of the upper cover conforms to a circumferential motion, determining that the first operation is received; and when it is determined that the first operation is received, continuing to detect a capacitance value of the detection region.

With reference to the first aspect, in a possible design manner, the method includes: when the display is on, controlling the acceleration sensor to stop collecting the real-time acceleration value; and when the display changes from on to off, controlling the acceleration sensor to continue to collect the real-time acceleration value.

With reference to the first aspect, in a possible design manner, the electronic device includes an upper cover and a vibration sensor. The vibration sensor is disposed on the upper cover. The method includes: collecting vibration information of the upper cover by using the vibration sensor; when the vibration information indicates that the upper cover meets a vibration condition, determining that the first operation is received; and when it is determined that the first operation is received, continuing to detect a capacitance value of the detection region.

With reference to the first aspect, in a possible design manner, the method includes: when the display is on, controlling the vibration sensor to stop collecting the vibration information; and when the display changes from on to off, controlling the vibration sensor to continue to collect the vibration information.

With reference to the first aspect, in a possible design manner, the electronic device includes a time of flight TOF sensor. The method includes: detecting ambient light information by using the TOF sensor; when the ambient light information indicates that an installation position of the TOF sensor is not blocked, determining that the first operation is received; and when it is determined that the first operation is received, continuing to detect a capacitance value of the touch panel.

With reference to the first aspect, in a possible design manner, the electronic device is a notebook computer, or the display of the electronic device is a foldable screen.

According to a second aspect, an embodiment of this application provides an electronic device, where the electronic device includes one or more processors, one or more memories, and a display. The display includes a touch panel, the one or more memories and the display are coupled to the one or more processors, the one or more memories are configured to store computer program code, the computer program code includes computer instructions, and when the one or more processors execute the computer instructions, the foregoing one or more processors are configured to obtain capacitance values of a detection region of the touch panel, where a location point at which a difference between a capacitance value in the detection region and a first value exceeds a first preset threshold is a contact region, and a location point at which a difference between a capacitance value in the detection region and the first value does not exceed the first preset threshold is a contactless region; the foregoing one or more processors are further configured to: when the contact region meets a first predetermined condition or the contactless region meets a second predetermined condition, control the display to turn off; the foregoing one or more processors are further configured to: when the contactless region does not meet the second predetermined condition or the contact region does not meet the first predetermined condition, control the display to turn on.

With reference to the second aspect, in a possible implementation, the first predetermined condition includes one or a combination of more of the following: An area ratio of the contact region to the detection region exceeds a first ratio; a capacitance value corresponding to the contact region is not less than a capacitance threshold; and existence duration of the contact region exceeds preset duration.

With reference to the second aspect, in a possible implementation, the second predetermined condition includes: An area ratio of the contactless region to the detection region does not exceed a first ratio.

With reference to the second aspect, in a possible implementation, the detection region is all or a part of the touch panel.

With reference to the second aspect, in a possible implementation, after the display is controlled to turn off, the foregoing one or more processors are further configured to obtain a capacitance value of the detection region by using a first frame rate. The first frame rate is lower than a second frame rate. The second frame rate is a refresh frame rate of the touch panel when the display is on.

With reference to the second aspect, in a possible implementation, after the display is controlled to turn off, the foregoing one or more processors are further configured to suspend detection of a capacitance value of the touch panel within a first time period, where the first time period is a time period between a moment at which the display turns off and a moment of receiving a first operation of a user.

With reference to the second aspect, in a possible implementation, the electronic device includes a microphone. The microphone is configured to collect ambient sound data.

The foregoing one or more processors are further configured to: when the ambient sound data is a cover opening sound of the electronic device, determine that the first operation is received.

The foregoing one or more processors are further configured to: when it is determined that the first operation is received, continue to detect a capacitance value of the detection region.

With reference to the second aspect, in a possible implementation, the microphone is configured to stop collecting the ambient sound data when the display is on.

The microphone is further configured to: when the display changes from on to off, continue to collect the ambient sound data.

With reference to the second aspect, in a possible implementation, the electronic device includes an upper cover and an acceleration sensor. The acceleration sensor is disposed on the upper cover.

The acceleration sensor is configured to collect a real-time acceleration value of the upper cover.

The foregoing one or more processors are further configured to: when the real-time acceleration value indicates that a motion track of the upper cover conforms to a circumferential motion, determine that the first operation is received.

The foregoing one or more processors are further configured to: when it is determined that the first operation is received, continue to detect a capacitance value of the detection region.

With reference to the second aspect, in a possible implementation, the acceleration sensor is further configured to: when the display is on, stop collecting the real-time acceleration value.

The acceleration sensor is further configured to: when the display changes from on to off, continue to collect the real-time acceleration value.

With reference to the second aspect, in a possible implementation, the electronic device includes an upper cover and a vibration sensor. The vibration sensor is disposed on the upper cover.

The vibration sensor is configured to collect vibration information of the upper cover.

The foregoing one or more processors are further configured to: when the vibration information indicates that the upper cover meets a vibration condition, determine that the first operation is received.

The foregoing one or more processors are further configured to: when it is determined that the first operation is received, continue to detect a capacitance value of the detection region.

With reference to the second aspect, in a possible implementation,

The vibration sensor is further configured to: when the display is on, stop collecting the vibration information.

The vibration sensor is further configured to: when the display changes from on to off, continue to collect the vibration information.

With reference to the second aspect, in a possible implementation, the electronic device includes a time of flight TOF sensor.

The TOF sensor is configured to detect ambient light information.

The foregoing one or more processors are further configured to: when the ambient light information indicates that an installation position of the TOF sensor is not blocked, determine that the first operation is received.

The foregoing one or more processors are further configured to: when it is determined that the first operation is received, continue to detect a capacitance value of the touch panel.

With reference to the second aspect, in a possible implementation, the electronic device is a notebook computer, or the display of the electronic device is a foldable screen.

According to a third aspect, an embodiment of this application provides a computer storage medium. The computer storage medium includes computer instructions, and when the computer instructions are run on an electronic device, the electronic device is enabled to execute the method according to any one of the first aspect and the possible design manners of the first aspect.

According to a fourth aspect, an embodiment of this application provides a computer program product. When the computer program product runs on a computer, the computer is enabled to execute the method according to any one of the first aspect and the possible design manners of the first aspect.

It may be understood that the foregoing provided electronic device according to any one of the second aspect and the possible design manners thereof, the computer storage medium according to the third aspect, and the computer program product according to the fourth aspect are all used to execute the foregoing corresponding method. Therefore, for beneficial effects that can be achieved by the foregoing electronic device, the computer storage medium, and the computer program product, refer to the beneficial effects in the foregoing corresponding method, and details are not described herein again.

DESCRIPTION OF EMBODIMENTS

Embodiments of this application provide a display control method, which is applied to a screen display control process of a terminal device. The terminal device includes a display. The display includes a touch panel (touch panel, TP), or may be referred to as a panel. For example, the touch panel may be a capacitive touch panel. The foregoing display may be fastened to a shielding surface, which is, for example, referred to as a first surface. In a state of being fastened to the display, the first surface may cover the display.

Figure 1:
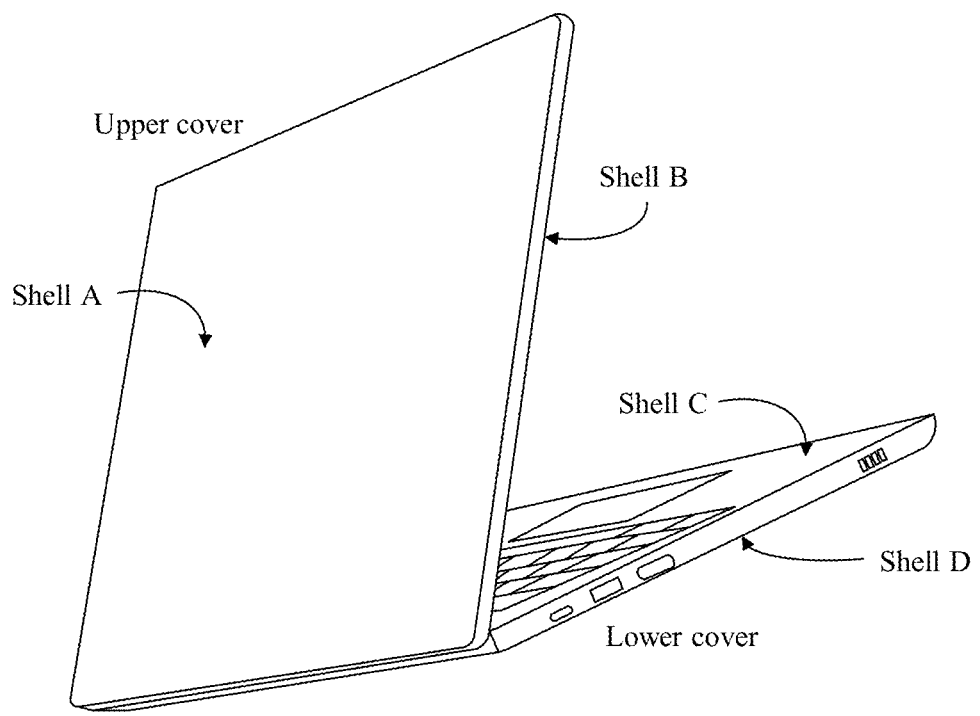
FIG. 1 is a first diagram of an example of a terminal device according to an embodiment of this application.

In some embodiments, the foregoing first surface may be a surface provided by a structure of the terminal device. For example, when the terminal device is a notebook computer, as shown in FIG. 1, the notebook computer is divided into an upper cover and a lower cover. The upper cover includes a display, and the lower cover includes a keyboard. The upper cover includes a shell A and a shell B. The shell A and the shell B are fastened, and the display is embedded between the shell A and the shell B. The lower cover includes a shell C and a shell D. The shell C and the shell D are fastened, and the keyboard is embedded between the shell C and the shell D.

Figure 2:
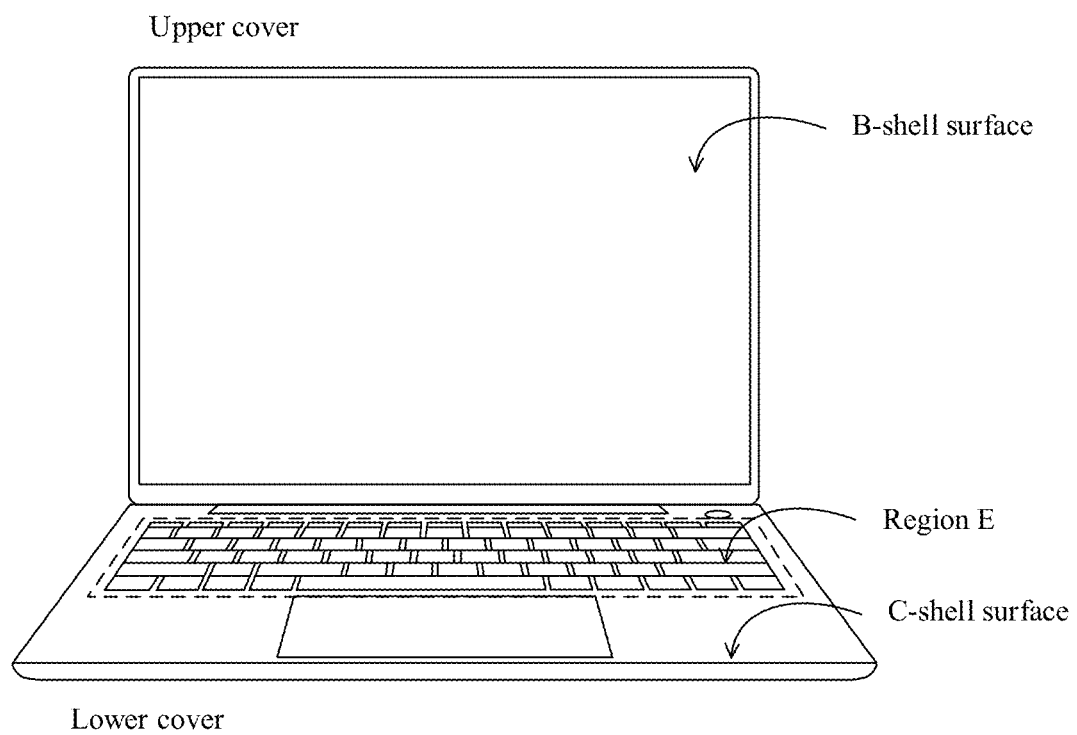
FIG. 2 is a second diagram of an example of a terminal device according to an embodiment of this application.

As shown in FIG. 2, a surface provided by the shell B and the touch panel of the display may be referred to as a B-shell surface. A surface provided by the shell C and the keyboard may be referred to as a C-shell surface. When the notebook computer is in a closed-cover state (that is, the upper cover and the lower cover are fastened), the B-shell surface may be fastened to the C-shell surface. When the B-shell surface is fastened to the C-shell surface, the C-shell surface can block the B-shell surface. That is, the C-shell surface of the notebook computer is the first surface in the foregoing definition.

Figure 3:
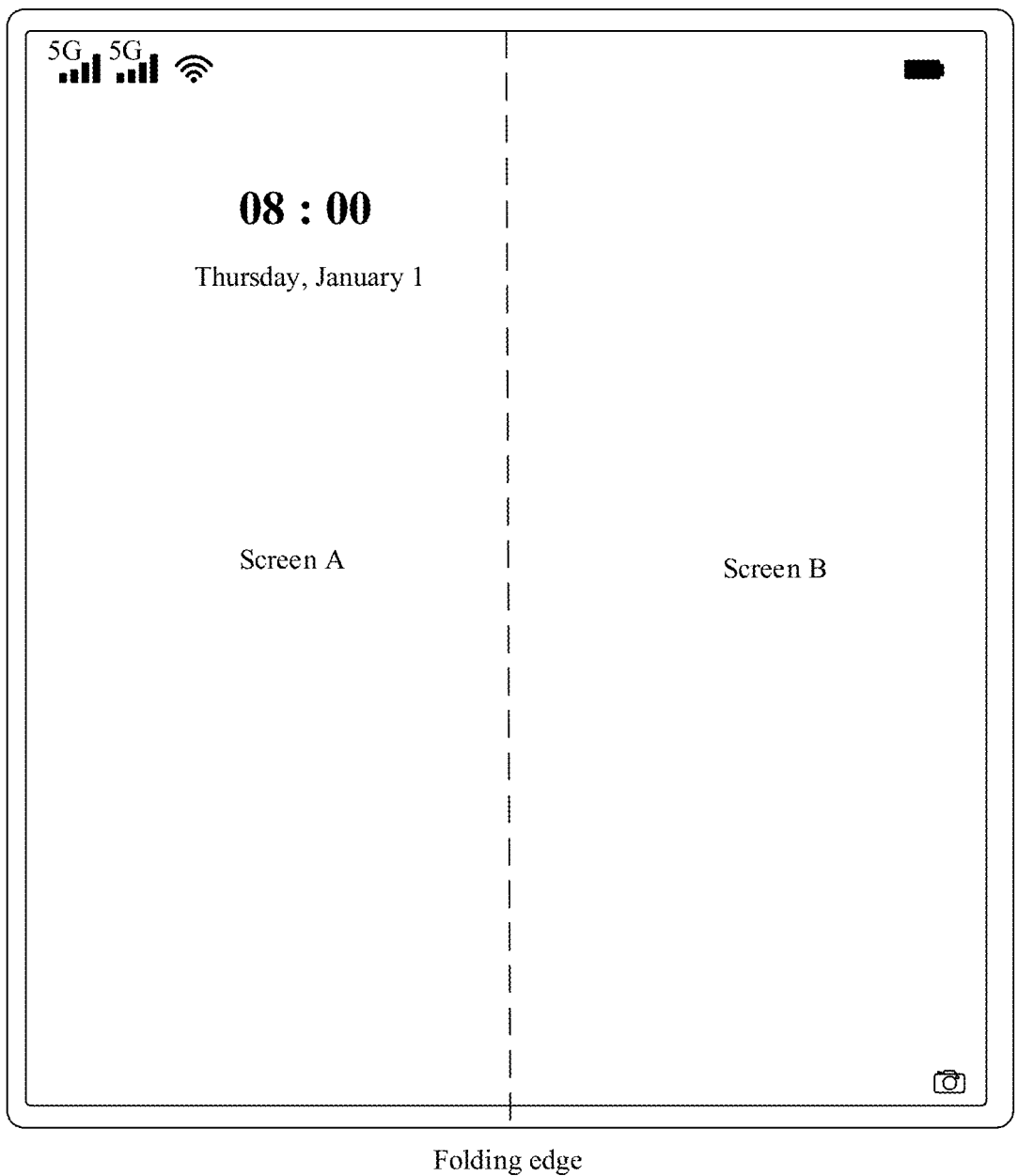
FIG. 3 is a third diagram of an example of a terminal device according to an embodiment of this application.

For another example, when the terminal device is a tablet computer (or a mobile phone) with a foldable display, as shown in FIG. 3, after the foldable display is folded along a folding edge, a screen A and a screen B are formed. After the screen A and the screen B are fastened, the screen A and the screen B can block each other. Therefore, in the fastened state, the screen A is the first surface relative to the screen B, and the screen B is also the first surface relative to the screen A.

In other embodiments, the foregoing first surface may be a surface provided by an external structure independent of the terminal device. For example, the terminal device is a tablet computer, and a protective shell installed on the tablet computer has a rotatable shield. When the shield rotates to be fastened with the display of the tablet computer, the shield can block the display of the tablet computer. That is, in the fastened state, a surface that is of the shield and that faces the display is the first surface.

For another example, when the terminal device is a tablet computer, and the display of the tablet computer is attached to a desktop, the desktop is the first surface.

The foregoing examples are merely examples of existence forms of the first surface, and are not intended to limit the first surface.

In a scenario in which the first surface exists, an optimal screen display control effect is as follows: When the display is fastened to the first surface, the display is controlled to turn off. When the display and the first surface change from the fastened state to a detached state, the display is controlled to turn on. In this way, the terminal device can not only implement energy saving, but also provide a service for a user in a timely manner.

In some embodiments, that the foregoing display turns on may be that the display is restored to a normal working state. For example, a black screen is visually lit. For another example, the display may be restored from a low energy consumption state to a normal energy consumption state.

In some embodiments, that the display turns off may be that the display enters a sleep mode or a power saving mode. For example, the lit display is visually changed to a black screen. For another example, the display enters a low energy consumption state from a normal energy consumption state.

In a related technology, the terminal device detects, by using a Hall effect sensor, whether the display and the first surface are in a fastened state, so as to implement a control policy such as turning off in a fastened state and turning on in a detached state. However, the Hall effect sensor is a magnetic field sensor produced according to the Hall effect. This also means that the Hall effect sensor is susceptible to external magnetic field interference during operation. For example, in a strong magnetic field environment, a Hall effect sensor may fail. This causes a screen display control failure. For example, the display and the first surface change from a fastened state to a detached state. Because a strong magnetic field exists, it may be misjudged that the display and the first surface are still in a fastened state, and consequently an expected effect of turning on in a detached state cannot be achieved.

In addition, the Hall effect sensor starts to work once a magnetic field is detected. Therefore, even in a normal environment, because the Hall effect sensor is excessively sensitive to a magnetic field, it is easy to misjudge that the display is fastened to the first surface when the display is relatively close to but not in contact with the first surface, and then the display is erroneously controlled to be off.

To resolve an impact of a magnetic field environment on display control, and avoid a problem of incorrect display control, an embodiment of this application provides a display control method. A capacitance detection mechanism of a touch panel is used to detect a contact area between the display and the first surface, and to determine, based on the contact area, whether the display is fastened to the first surface, so as to control an on/off state of the display.

For example, it may be detected whether there is a large area in which the display and the first surface are in contact. For example, when it is detected that a contact area between the display and the first surface is greater than a threshold, it is considered that the display is in contact with the first surface in a large area. When it is detected that the display is in contact with the first surface in a large area, it is determined that the display is fastened to the first surface. When it is detected that the display is not in contact with the first surface in a large area, it is determined that the display is not fastened to the first surface. In this way, the display may be controlled to be on/off according to whether the display and the first surface are in a fastened state.

It may be understood that the foregoing capacitance detection mechanism is as follows: When a conductor contacts at any position on the touch panel of the display, a capacitance value of the contact position increases accordingly. It should be noted that the foregoing contact of the conductor means that a distance between the conductor and the touch panel is not zero and does not exceed a sensing distance of the panel. That is, the conductor is actually in floating contact with the touch panel. For example, in a scenario in which a hand contacts the display, actual contact is generated between the hand and a glass surface of the display. Because the glass surface is covered on the touch panel, floating contact is also generated between the hand and the touch panel.

In this way, by analyzing the change of the capacitance value on the touch panel, it can be determined whether the touch panel is in contact with a conductor and a position in contact is determined.

Apparently, in this embodiment of this application, using the capacitance detection mechanism is not affected by an electromagnetic environment, which avoids a problem of a screen control failure.

In addition, the touch panel is a main part of the display, and occupies a majority of areas on the display. Therefore, large-area contact detection can be implemented. In addition, in this embodiment of this application, a large area of contact needs to be detected before it is determined that the display is fastened to the first surface. This reduces the possibility of misjudging the fastening state and improves the accuracy of screen display control compared with the Hall effect sensor, which can only detect a single point.

It should be noted that, to change a capacitance value on the panel when the touch panel is in contact with the first surface, the first surface needs to have a conductive capability. For example, the first surface may be a surface provided by a structure made of conductive metal. For example, with reference to FIG. 2, when the terminal device is a notebook computer, the lower cover may be made of conductive metal. In this way, the C-shell surface has a conductive capability. For example, the first surface may be a surface provided by a conductive coating on a structure (or an external structure) of the terminal device. For example, in a case in which the lower cover of the notebook computer is made of a plastic material, a conductive coating is disposed on the outside of the lower cover. In this way, the C-shell surface has a conductive capability.

In addition, the foregoing first surface may alternatively have a conductive capability in some regions. For example, when the terminal device is a notebook computer, the keyboard part is made of plastic. That is, a region E in the C-shell surface shown in FIG. 2 does not have a conductive capability. Other parts of the lower cover except the keyboard are made of conductive metal. That is, in the C-shell surface shown in FIG. 2, other regions except the region E have a conductive capability. In this way, while ensuring recognition, weight of the C-shell surface is reduced and costs are reduced.

For example, the terminal device in embodiments of this application may be a device such as a portable computer (such as a mobile phone), a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or a media player that has a display. A specific form of the terminal device is not specifically limited in embodiments of this application.

Figure 4:
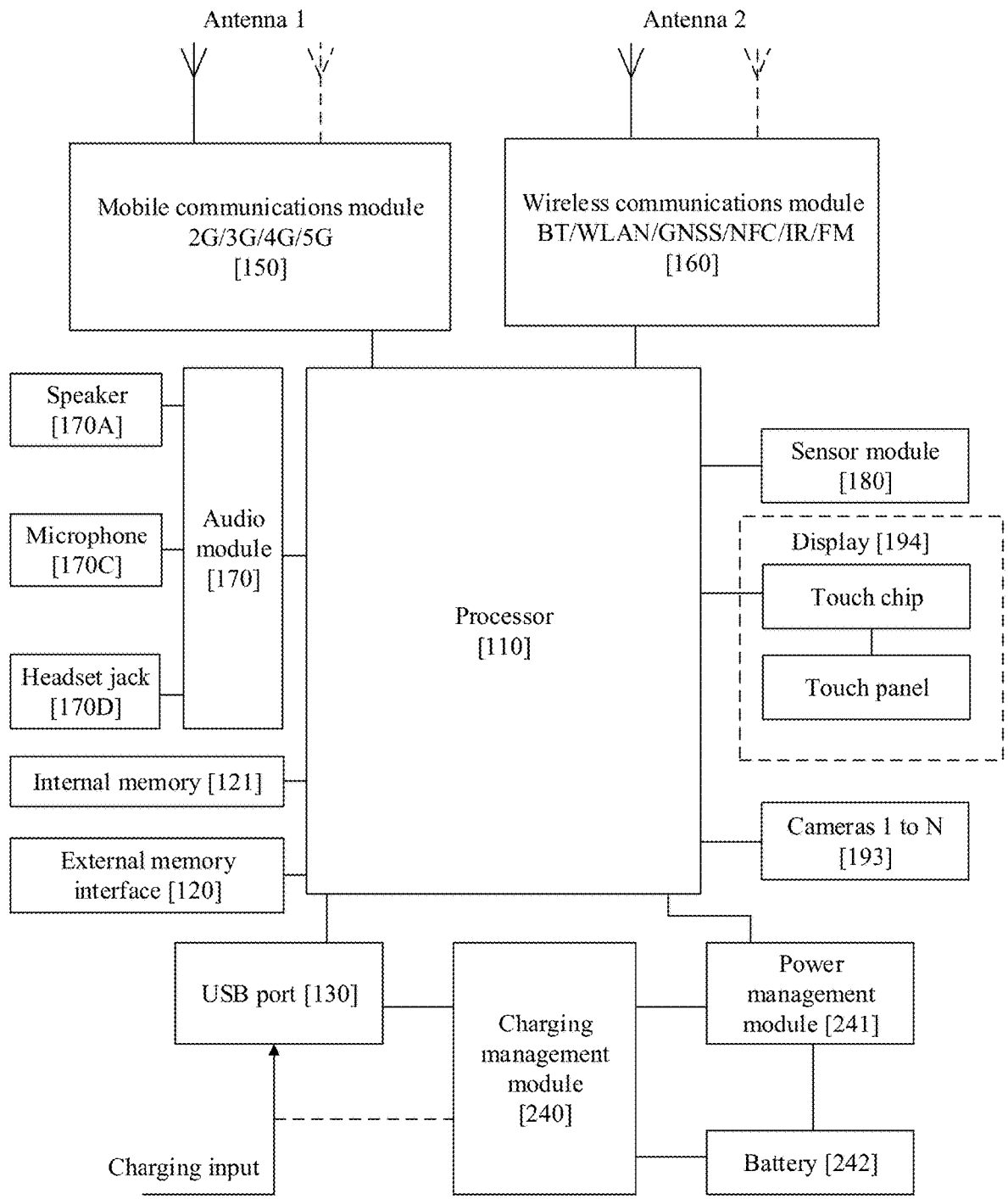
FIG. 4 is a schematic diagram of a structure of a notebook computer according to an embodiment of this application.

In an example in which the terminal device is a notebook computer, FIG. 4 shows a schematic diagram of a structure of a notebook computer.

The notebook computer may include a processor 110, an external memory interface 120, an internal memory 121, a universal serial bus (universal serial bus, USB) port 130, an antenna 1, an antenna 2, a mobile communications module 150, a wireless communications module 160, an audio module 170, a speaker 170A, a microphone 170C, a headset jack 170D, a sensor module 180, and the like.

It may be understood that the structure shown in this embodiment of the present invention does not constitute a specific limitation on the notebook computer. In other embodiments of this application, the notebook computer may include more or fewer components than those shown in the figure, or some components may be combined, or some components may be split, or components are arranged in different manners. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or data again, the instruction or data may be directly invoked from the memory. Therefore, repeated access is avoided, a waiting time of the processor 110 is reduced, and system efficiency is improved.

A wireless communication function of the notebook computer may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the notebook computer may be configured to cover a single or a plurality of communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The mobile communications module 150 may provide a wireless communication solution, including 2G/3G/4G/5G or the like, that is applied to the notebook computer. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal obtained after modulation by the modem processor, and convert the signal into an electromagnetic wave through the antenna 1 for radiation. In some embodiments, at least a part of the functional modules of the mobile communications module 150 may be disposed in the processor 110. In some embodiments, at least a part of the functional modules of the mobile communications module 150 may be disposed in the same device as at least a part of the modules of the processor 110.

The wireless communications module 160 may provide a solution to wireless communication applied to the notebook computer, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components that integrate at least one communication processing module. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 of the notebook computer is coupled to the mobile communications module 150, and the antenna 2 is coupled to the wireless communications module 160, so that the notebook computer can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The notebook computer implements a display function by using the GPU, the display 194, the application processor, and the like. The GPU is a microprocessor for image processing, and is connected to the display 194 and the application processor. The GPU is configured to perform mathematical and geometrical calculation, and is configured to perform graphics rendering. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like.

In some embodiments, the foregoing display may include a touch panel. In this scenario, the display further includes a touch chip corresponding to the touch panel. That is, as shown in FIG. 4, the touch panel is electrically connected to the touch chip. The touch chip is electrically connected to the processor 110. Therefore, a location of the display that is operated by the user is determined through collecting by the touch panel and processing by the touch chip.

In some embodiments, the notebook computer may include one or N displays 194, where N is a positive integer greater than 1.

The notebook computer may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the notebook computer may include one or N cameras 193, where N is a positive integer greater than 1.

The digital signal processor is configured to process a digital signal, and in addition to a digital image signal, may further process another digital signal. For example, when the notebook computer performs frequency selection, the digital signal processor is configured to perform Fourier transform and the like on frequency energy.

The video codec is configured to compress or decompress a digital video. The notebook computer may support one or more video codecs. In this way, the notebook computer may play or record videos in a plurality of coding formats, for example, moving picture experts group (moving picture experts group MPEG) 1, MPEG 2, MPEG 3, and MPEG 4.

The external memory interface 120 may be configured to connect to an external memory card, for example, a micro SD card, to extend a storage capability of the notebook computer. The external storage card communicates with the processor 110 through the external memory interface 120, to implement a data storage function. For example, files such as music and a video are stored in the external memory card.

The internal memory 121 may be configured to store computer-executable program code, where the computer-executable program code includes instructions. The processor 110 executes various functional applications of the notebook computer and data processing by running instructions stored in the internal memory 121. The internal storage 121 may include a program storage area and a data storage area. The program storage area may store an operating system, an application program (for example, a sound playback function or an image playback function) required by at least one function, and the like. The data storage region may store data (for example, audio data and screen recording data) and the like created when the notebook computer is used. In addition, the internal memory 121 may include a high-speed random access memory, or may include a non-volatile memory such as at least one magnetic disk memory, a flash memory, or a universal flash storage (universal flash storage, UFS).

The notebook computer may implement audio functions by using the audio module 170, the speaker 170A, the microphone 170C, the headset jack 170D, the application processor, and the like. The audio functions are, for example, music playback and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The notebook computer can be used to listen to music through the speaker 170A.

The microphone 170C, also referred to as a "mike" or a "mic", is configured to convert a sound signal into an electrical signal. The notebook computer may be provided with at least one microphone 170C. In other embodiments, the notebook computer may be provided with two microphones 170C, and in addition to collecting a sound signal, a noise reduction function may be implemented. In some other embodiments, the notebook computer may be provided with three, four, or more microphones 170C, so as to collect a sound signal, reduce noise, identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, a vibration sensor, a time of flight (time of flight, TOF) sensor, and the like.

Certainly, the notebook computer may further include a charging management module 240, a power management module 241, a battery 242, a keyboard, an indicator, one or more SIM card interfaces, and the like. This is not limited in this embodiment of this application.

The display control method provided in this embodiment of this application may be implemented in a terminal device, for example, implemented by the notebook computer shown in FIG. 4.

Figure 5:
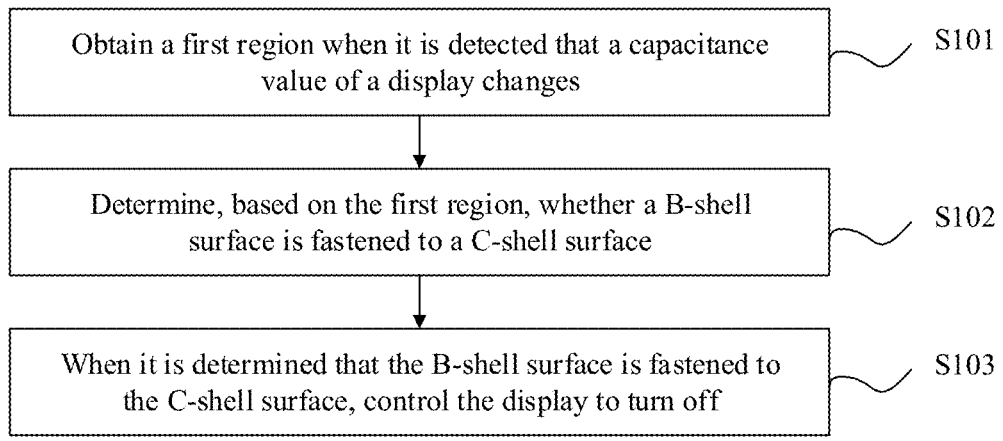
FIG. 5 is a first flowchart of steps of a display control method according to an embodiment of this application.

That the terminal device is a notebook computer is used as an example. The foregoing display control method may be applied to a process of turning off a screen upon closing of a cover of the notebook computer. That is, in a case in which a display (the B-shell surface) of the notebook computer is separated from a first surface (the C-shell surface) (that is, the notebook computer is in an open-cover state) and the display is on, as shown in FIG. 5, the foregoing display control method may include the following steps.

S101: Obtain a first region when it is detected that a capacitance value of the display changes.

The detection of the change in the capacitance value of the display is actually detection performed on a touch panel of the display. The touch panel may also be referred to as a panel. In some embodiments, a capacitance value of the panel may be obtained by using a touch chip corresponding to the touch panel.

It may be understood that the touch chip may collect a current change status of the panel. In addition, a capacitance value corresponding to a current change location may be determined based on the collected current change status.

When the touch panel is not in actual or floating contact with a conductor (floating contact means that a distance between the conductor and the panel is not zero and does not exceed a sensing distance of the panel), the current on the panel may be kept at a relatively stable value. When the touch panel is in contact with or floating contact with a conductor, the current at the contact position on the panel changes. Correspondingly, a capacitance value of the contact position also changes. For example, when the touch panel is in floating contact with a conductor, a capacitance value of a contact position increases. When the touch panel is in actual contact with the conductor, a capacitance value of a contact position changes to zero. When there is no contact between the touch panel and the conductor, the capacitance value of the touch panel remains stable.

It may be understood that a principle of detecting a capacitance value by the touch chip may change with iteration of the touch chip. What does not change is that when the touch panel is in actual or floating contact with a conductor, the capacitance value of the contact position also changes.

Apparently, because the C-shell surface of the notebook computer has a conductive capability, when the B-shell surface is fastened to the C-shell surface, the touch panel is in floating contact with the C-shell surface, and this inevitably causes a change in a capacitance value of the panel. It may be understood that the panel occupies a majority of areas on the B-shell surface. Therefore, when the B-shell surface is fastened to the C-shell surface, the C-shell surface is in contact with the panel in a large area. Further, a capacitance value of the contact part on the panel increases.

Certainly, not only the C-shell surface can cause the capacitance value of the panel to change, but floating contact between other conductors and the touch panel can also cause the corresponding capacitance value to change. Generally, when a hand is in contact with the glass surface, because the glass surface is covered on the touch panel, the hand is in floating contact with the touch panel. This will cause the capacitance value of the contact position on the panel to change.

Therefore, in this embodiment of this application, the first region, also referred to as a contact region, is obtained based on an increase in the capacitance value of the touch panel. Whether the C-shell surface of the notebook computer is in contact with the B-shell surface is detected through analysis of the first region. The foregoing first region includes all location points whose capacitance values exceed a normal value (which may also be referred to as a first value) on the lower panel at a same moment. The foregoing normal value is an average capacitance value on the touch panel when the touch panel is not touched.

For example, the normal value may be pre-tested. Then, a capacitance value on the panel is compared with the normal value. If a difference between the capacitance value and the normal value exceeds a preset threshold 1, it is determined that the capacitance value of the display increases, that is, the capacitance value changes. Then, all capacitance values whose differences between the capacitance values on the panel and the normal value exceed the preset threshold 1 at a same moment and location points corresponding to the capacitance values are obtained. In this way, the first region, that is, a region formed by the location points on the panel at which differences between the capacitance values and the normal value exceed the preset threshold 1, is obtained. In addition, the foregoing preset threshold 1 may be a fluctuation amplitude of a capacitance on the touch panel when the touch panel is not contacted. The foregoing preset threshold 1 may be obtained through testing in advance.

In this way, accidental capacitance fluctuation on the panel, which results in a misjudgment of a change of a capacitance value, can be avoided. Therefore, recognition accuracy is improved to a specific extent.

In another possible embodiment, in a process of turning off the screen upon closing of the cover, the first region (that is, the contact region) may be further determined based on a location point at which a capacitance value changes on the touch panel. That is, in this embodiment, the first region includes all location points at which capacitance values are increased on the lower panel at a same moment.

For example, capacitance information of the panel may be obtained by using the touch chip on a frame-by-frame basis. Capacitance information of each frame includes capacitance values of all location points on the lower panel at the same moment. Therefore, the collected capacitance information of the current frame may be compared with capacitance information of a previous adjacent frame. For example, first, a first location point is determined on the panel based on the capacitance information of the current frame and the capacitance information of the previous adjacent frame, that is, a location point at which a capacitance value changes is determined. Second, a current capacitance value corresponding to the first location point is obtained from the capacitance information of the current frame, and a capacitance value corresponding to the first location point at a previous adjacent moment is obtained from the capacitance information of the previous adjacent frame. Then, a capacitance difference 1 between the current capacitance value and the capacitance value at the previous adjacent moment is determined. If the capacitance difference 1 exceeds the preset threshold 1, it is determined that the capacitance value on the panel increases, that is, the capacitance value of the display changes. Finally, the first region is obtained based on all the first location points at which the capacitance values increase, that is, a region that includes the first location points at which the capacitance values increase.

In addition, when the B-shell surface and the C-shell surface of the notebook computer are fastened, the entire touch panel is in floating contact with the C-shell surface. However, the contact between the hand and the touch panel is usually a small range of floating contact. Therefore, in some embodiments, whether capacitance values in the entire panel change may be monitored, and the first region may be determined from the entire touch panel. Therefore, accuracy of determining whether the B-shell surface and the C-shell surface are fastened is improved.

Certainly, increase in the capacitance values of the entire touch panel is not a unique condition for identifying whether the B-shell surface and the C-shell surface are fastened. Therefore, in other embodiments, whether capacitance values of a local region in the panel change may be monitored, and the first region may be determined from the local region. In this way, energy consumption for detection on the full panel can be effectively reduced.

Figure 6:
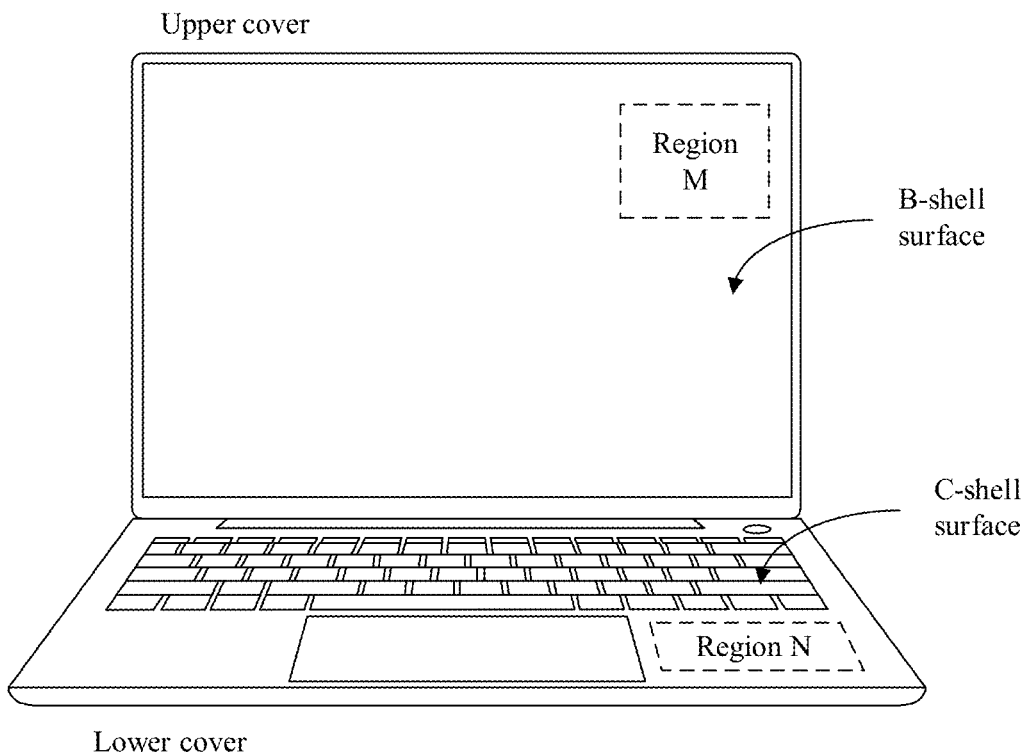
FIG. 6 is a diagram of an example of a notebook computer according to an embodiment of this application.

For example, in the notebook computer shown in FIG. 6, a region M in the B-shell surface is used as a selected local region. When a change of the capacitance value in the region M is detected, the first region is determined from the region M. In this way, when the B-shell surface is actually not fastened to the C-shell surface, and the user performs a touch operation in a region other than the region M by using a hand, a procedure for determining whether the B-shell surface is in floating contact with the C-shell surface is not triggered, thereby reducing unnecessary system resource occupation. Certainly, when an increase in a capacitance value is detected in the region M, a procedure for determining whether the B-shell surface is in floating contact with the C-shell surface is normally triggered, and the first region is obtained from the region M, so as to analyze whether the B-shell surface and the C-shell surface are fastened.

When the capacitance values of the whole panel are monitored, the whole panel can be considered as the detection region. Similarly, in a case in which capacitance values of a local region in the monitoring panel change, the local region in the panel may be considered as the detection region. Then, capacitance values of all the location points in the detection region may be obtained by using the touch chip.

To ensure that a capacitance value change can occur in the detection region when the B-shell surface is actually fastened to the C-shell surface, in some embodiments, all the C-shell surface of the notebook computer may have a conductive characteristic.

In other embodiments, only a region opposite to the detection region may have a conductive characteristic in the C-shell surface of the notebook computer. Further, FIG. 6 is used as an example. In FIG. 6, a region N in the C-shell surface may have a conductive characteristic, but other regions do not. It should be noted that when the B-shell surface is fastened to the C-shell surface, the region M and the region N are in floating contact, and a shape and a size of the region M may be the same as those of the region N. In this way, when the B-shell surface is actually fastened to the C-shell surface, capacitor values corresponding to the entire panel are not triggered to be obtained, thereby reducing processing energy consumption.

In the foregoing embodiment, the capacitance values of the panel are directly obtained from the touch chip, and then the first region is determined based on the capacitance values of the panel. However, in another possible embodiment, the first region may be directly determined based on a current value collected by the panel.

For example, all current values collected at the same time on the panel may be compared with a conventional current value, and a current value 1 whose difference exceeds a preset current threshold is obtained. Then, a collection location corresponding to the current value 1 is determined. Then, it is determined, based on the obtained collection location, that a floating contact point exists on the panel. Finally, the first region is obtained based on the location point at which the floating contact exists.

S102: Determine, based on the first region, whether the B-shell surface is fastened to the C-shell surface.

In this embodiment of this application, after the first region is determined from the detection region based on the capacitance value changed on the panel, to exclude a case in which the capacitance value changes due to floating contact between another conductor and the panel, whether the B-shell surface is fastened to the C-shell surface may be determined with reference to attribute information of the first region.

In this embodiment of this application, the attribute information of the first region may include one or more items such as an area, a capacitance value, and existence duration of the first region.

For example, it may be determined, based on an area ratio of the first region to the detection region, whether the B-shell surface is fastened to the C-shell surface. For example, in a case in which the area ratio of the first region to the detection region exceeds a first ratio, it is determined that the B-shell surface is fastened to the C-shell surface.

The foregoing first ratio may be a preset empirical value. For example, the first ratio may be set to a value greater than 60%. In addition, the foregoing first ratio may also be a ratio obtained by the notebook computer by means of testing. For example, an area of the first region is measured for a plurality of times when the B-shell surface and the C-shell surface are actually fastened, and ratios of the areas of the first region to the area of the detection region are determined. Then, an average value of the ratios determined for a plurality of times is used as the first ratio.

Briefly, in the foregoing example, the following feature is used: a large-area contact may occur when the B-shell surface and the C-shell surface are fastened, and there is usually a small-area contact when another conductor (for example, a hand) is in contact with the panel, to distinguish the two common cases of "the B-shell surface and the C-shell surface are fastened" and "another conductor is in contact with the panel".

For another example, it may be determined, based on a capacitance value of each location point in the first region, whether the B-shell surface is fastened to the C-shell surface.

It may be understood that capacitance value changes caused by floating contact between different conductor media and the panel are different. For example, when a finger is in floating contact with the panel, a capacitance at the contact position is a capacitance value 1. When a metal is in floating contact with the panel, a capacitance at the contact position is a capacitance value 2. In this case, the capacitance value 1 is obviously less than the capacitance value 2.

Therefore, a capacitance value of a point at which the panel is in contact with the C-shell surface may be tested in advance as a capacitance threshold. Certainly, in another embodiment, the foregoing capacitance threshold may also be an average value of multiple contact locations when the panel is in floating contact with the C-shell surface. In addition, not to rule out, in some other possible embodiments, the foregoing capacitance threshold may be a lowest value of capacitance values corresponding to multiple contact location points when the panel is in floating contact with the C-shell surface.

Then, a capacitance value of each location point in the first region is compared with the foregoing capacitance threshold.

In some embodiments, if the capacitance values of all the location points in the first region are not less than the capacitance threshold, it is determined that the B-shell surface is fastened to the C-shell surface.

In other embodiments, it may be alternatively determined that the B-shell surface is fastened to the C-shell surface if an average value of the capacitance values corresponding to the first region is not less than the capacitance threshold. The average capacitance value is an average value of the capacitance values of all location points in the first region.

For another example, whether the B-shell surface is fastened to the C-shell surface may be determined based on existence duration of the first region.

The foregoing existence duration may be understood as duration of continuous existence of the first region. In a case in which the existence duration of the first region exceeds preset duration, it is determined that the B-shell surface is fastened to the C-shell surface. For example, the preset duration is 30 seconds. If the existence duration of the first region exceeds 30 seconds, it is determined that the B-shell surface is fastened to the C-shell surface.

After the location points that belong to the first region are determined on the panel, capacitance values corresponding to the location points in the first region need to be relatively stable. Therefore, whether the first region exists may be determined with reference to a capacitance value of each location point in the first region.

In some embodiments, in a case in which a difference between a capacitance value corresponding to the first region and a normal value is not less than the preset threshold 1, it is determined that the first region is in an existed state. Certainly, in some possible embodiments, it may be determined that the first region is in an existed state in a case in which differences between capacitance values corresponding to most location points in the first region and the normal value remain not less than the preset threshold 1. For example, if differences between capacitance values corresponding to 80% of location points in the first region and the normal value are not less than the preset threshold 1, it is determined that the first region is in an existed state. In this way, existence duration of the first region may be counted based on capacitance values corresponding to the first region at different moments.

In other embodiments, the capacitance value corresponding to each location point in the first region may be periodically detected. A capacitance value detected at a current moment is compared with a capacitance value detected at a previous moment adjacent to the current moment. If a difference between a capacitance value of each location point in the first region at the current moment and a capacitance value of each location point at the previous adjacent moment does not exceed a preset threshold 2, it is determined that the first region is in an existed state. Certainly, in some possible embodiments, if differences between capacitance values, at the current moment, corresponding to location points that exceed a preset proportion in the first region and capacitance values at the previous adjacent moment do not exceed the preset threshold 2, it may be determined that the first region is in an existed state. The foregoing preset threshold 2 is a fluctuation amplitude of the capacitance on the panel when the touch panel is in floating contact with the C-shell surface. In some embodiments, the preset threshold 2 may alternatively be obtained by means of testing in advance.

In this way, existence duration of the first region may be counted based on capacitance values corresponding to the first region at different moments.

In addition, in another possible embodiment, existence duration of the first region may alternatively be counted based on an area of the first region. For example, if the area ratio of the first region to the detection region is not less than the first ratio, it is determined that the first region exists. When the area ratio of the first region to the detection region is less than the first ratio, it is determined that the first region disappears. In this way, the existence duration of the first region may be counted based on areas corresponding to the first region at different moments.

Briefly, in the foregoing example, features that duration in which the C-shell surface and the B-shell surface are fastened is relatively long, other conductors (for example, a hand) are usually short in contact with the panel, and contact positions are not fixed are used to distinguish the two common cases of "the B-shell surface and the C-shell surface are fastened" and "another conductor is in contact with the panel".

Certainly, in the foregoing illustrated embodiment, any attribute information based on the first region is described to determine whether the B-shell surface and the C-shell surface are fastened. In another possible embodiment, to improve accuracy of determining, a plurality of pieces of attribute information of the first region may be combined, to determine whether the B-shell surface and the C-shell surface are fastened.

Figure 7:
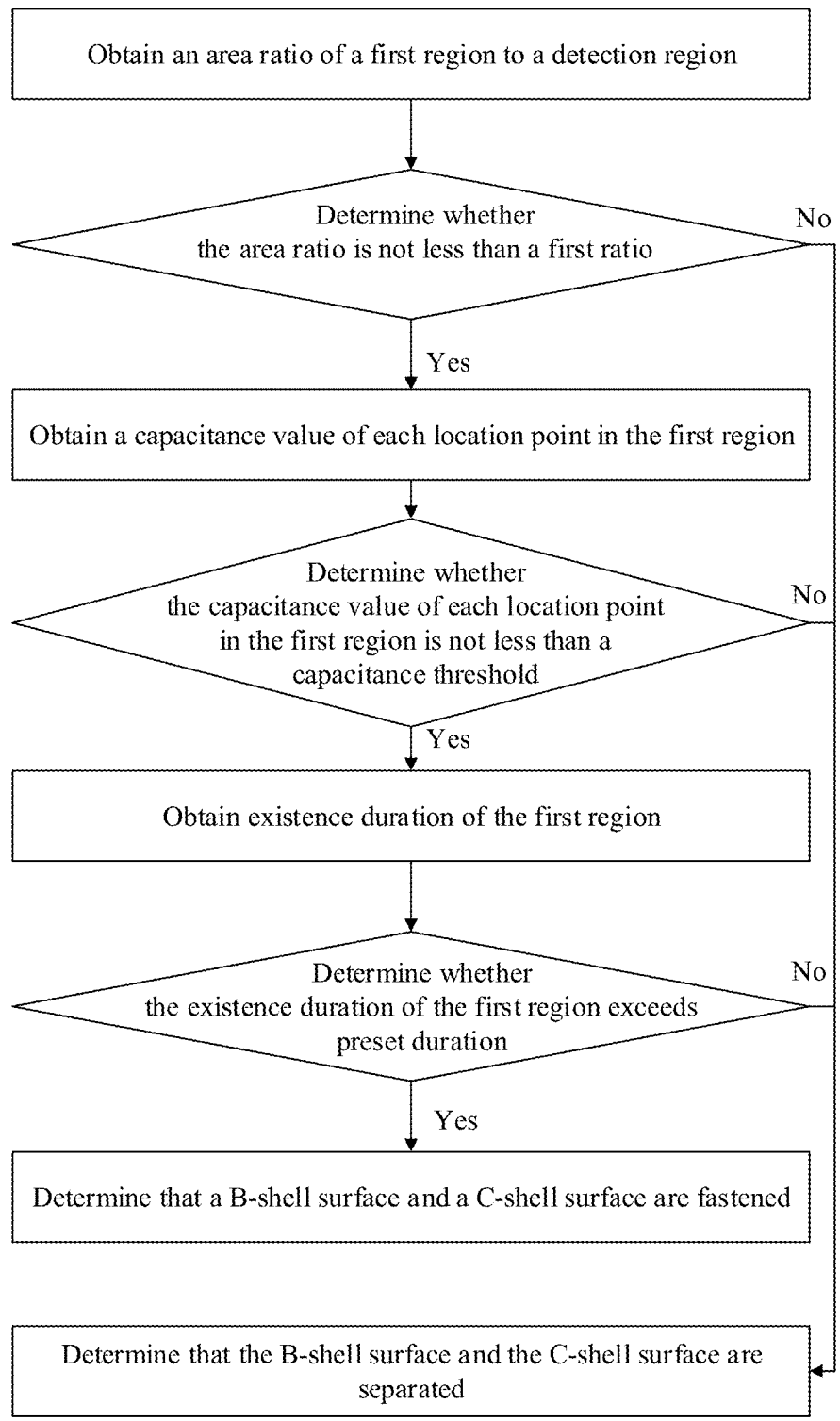
FIG. 7 is a flowchart of determining whether a B-shell surface is fastened to a C-shell surface according to an embodiment of this application.

For example, as shown in FIG. 7, after the first region is obtained, a ratio of the area of the first region to the area of the detection region is obtained. It is determined whether the area ratio is not less than the first ratio. When the area ratio is not less than the first ratio, a capacitance value of each location point in the first region is obtained. It is determined whether the capacitance value of each location point in the first region is not less than a capacitance threshold. When the capacitance value of each location point in the first region is not less than the capacitance threshold, the existence duration of the first region is obtained. It is determined whether the existence duration of the first region exceeds preset duration. When the existence duration of the first region exceeds the preset duration, it is determined that the B-shell surface is fastened to the C-shell surface.

In a case in which it is determined that the B-shell surface is fastened to the C-shell surface, the procedure may enter S103.

In some embodiments, in a case in which it is determined that the B-shell surface and the C-shell surface are not fastened, the display may be controlled to be on.

S103: When it is determined that the B-shell surface is fastened to the C-shell surface, control the display to turn off.

In this embodiment of this application, the display is controlled to change from on to off. In this way, the screen turning off upon closing of the cover of the notebook computer is implemented. In addition to controlling the notebook computer to turn off the screen upon closing of the cover, the notebook computer can be further controlled to enter a sleep state.

In some embodiments, S102 may be understood as determining whether the first region meets a first predetermined condition, and when it is determined that the first region meets the first predetermined condition, the display is controlled to turn off.

For example, the first predetermined condition may include one or a combination of more of the following determining conditions: "an area ratio of the first region to the detection region exceeds a first ratio", "a capacitance value corresponding to the first region is not less than a capacitance threshold", and "existence duration of the first region exceeds preset duration". When the first predetermined condition is a combination of at least two determining conditions, it is determined, if corresponding determining conditions are met, that the first region meets the first predetermined condition.

In the foregoing embodiment, whether to control the display to turn off is determined based on the first region. Actually, in another embodiment, whether to control the display to turn off may also be determined by using another region (that is, a contactless region) other than the first region. The contactless region includes a location point at which a difference between a capacitance value in the detection region and a normal value does not exceed a preset threshold 1.

For example, whether the contactless region meets a second predetermined condition may be determined. When the contactless region meets the second predetermined condition, the display is controlled to turn off. The second predetermined condition may be that an area ratio of the contactless region to the detection region does not exceed the first ratio.

Figure 8:
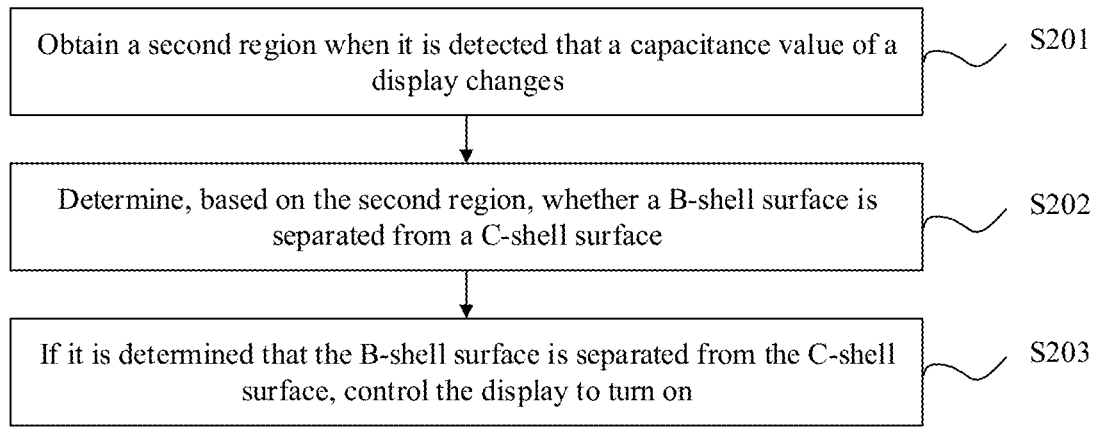
FIG. 8 is a second flowchart of steps of a display control method according to an embodiment of this application.

In addition, the foregoing display control method may be further applied to a process of turning on the screen upon opening of the cover of the notebook computer. That is, in a case in which the display (the B-shell surface) of the notebook computer is fastened to the first surface (the C-case surface) and the display is off, as shown in FIG. 8, the display control method may include the following steps.

S201: Obtain a second region when it is detected that a capacitance value of the display changes. The second region is a contact region in a closed-cover state.

In some embodiments, capacitance information of the detection region may be obtained frame by frame based on a frame rate 1 (that is, a second frame rate). The capacitance information of the detection region includes a capacitance value corresponding to each location point in the detection region. The second frame rate is a refresh frame rate of the touch panel when the display is on.

For example, the capacitance information of the detection region may be obtained by using the touch chip. That is, the touch chip refreshes the capacitance value of each location point on the panel based on the frame rate 1, and obtains, from the capacitance values obtained through refreshing, a capacitance value that belongs to the detection region.

In a case in which a capacitance value decreases in the detection region, the second region may be further determined from the detection region.

In some embodiments, the foregoing second region may include location points at which capacitance values exceed a normal value at the same time in the detection region, that is, a location point at which a difference between a capacitance value and a normal value in the detection region exceeds the preset threshold 1. In this embodiment, for a manner of obtaining the second region, refer to the manner of obtaining the first region in the foregoing embodiment. Details are not described herein again.

In other embodiments, the capacitance information of the detection region may also be obtained frame by frame based on the frame rate 2 (that is, the first frame rate). The frame rate 1 is greater than the frame rate 2.

It may be understood that a higher frame rate leads to a better recognition effect of the panel on actual contact or floating contact. However, a high frame rate inevitably leads to high energy consumption. During a period in which the notebook computer enters an open-cover state from the closed-cover state, and during a period in which the notebook computer is in the closed-cover state, the panel does not require high sensitivity to contact identification. Therefore, when the B-shell surface and the C-shell surface of the notebook computer are in a fastened state, capacitance information of the detection region may be obtained at a relatively low frame rate (that is, the first frame rate). When the capacitance value of the detection region decreases, the second region is determined. Therefore, an energy saving effect can be achieved.

In fact, the frame rate 1 and the frame rate 2 are used to obtain the capacitance information of the detection region. Each of the two has an advantage. When implementing the method provided in the embodiments of this application, a person skilled in the art may flexibly configure a frame rate for obtaining the capacitance information of the detection region.

For example, when the cover of the notebook computer is closed, a fixed frame rate actually used is configured, so that the capacitance information of the detection region is obtained based on the fixed frame rate. For example, the frame rate 1 is configured as the fixed frame rate. For another example, the frame rate 2 is configured as the fixed frame rate.

For another example, the capacitance information of the detection region may be dynamically obtained by using the frame rate 1 or the frame rate 2 based on a power status of the notebook computer.

For example, the foregoing power status may include information indicating whether the notebook computer is being charged. In this way, when the power status indicates that the notebook computer is being charged, the capacitance information of the detection region may be obtained by using the frame rate 1. That is, a relatively high refresh frame rate is used to ensure detection sensitivity. When the power status indicates that the notebook computer is not being charged, the capacitance information of the detection region is obtained by using the frame rate 2. That is, a low refresh frame rate is used to implement energy saving.

The foregoing power status may further include remaining power information of the notebook computer. In this way, when the remaining power information exceeds a preset power threshold, the capacitance information of the detection region is obtained by using the frame rate 1. That is, a relatively high refresh frame rate is used to ensure detection sensitivity. When the remaining power information does not exceed the preset power threshold, the capacitance information of the detection region is obtained by using the frame rate 2. That is, a low refresh frame rate is used to implement energy saving.

Certainly, in addition to using a relatively low frame rate, energy saving may be implemented by reducing a capacitance refresh range. The capacitance refresh range is a range in which a capacitance value monitored by the touch chip changes. It may be understood that, in some embodiments, the detection region is a local region on the touch panel. In this way, in a case in which the B-shell surface is fastened to the C-shell surface, the touch chip may also refresh only a capacitance value of each point in the detection region. Therefore, calculation energy consumption of the touch chip is effectively reduced.

S202: Determine, based on the second region, whether the B-shell surface is separated from the C-shell surface.

It may be understood that S202 is used to determine whether the B-shell surface is separated from the C-shell surface, and S102 is used to determine whether the B-shell surface is fastened to the C-shell surface. A determining logic corresponding to S202 and a determining logic corresponding to S102 are exactly the opposite.

In some embodiments, the second region is determined from the detection region. Whether the B-shell surface is separated from the C-shell surface may be analyzed with reference to attribute information of the second region.

In some embodiments, whether the B-shell surface is separated from the C-shell surface may be determined based on an area ratio of the second region to the detection region. For example, in a case in which the area ratio of the second region to the detection region does not exceed a first ratio, it is determined that the B-shell surface is separated from the C-shell surface.

It may be understood that, after the B-shell surface and the C-shell surface are separated, large area contact between the B-shell surface and the C-shell surface also disappears, and therefore, an area of the second region also decreases.

In some embodiments, it may be further determined, based on a capacitance value of each location point in the second region, whether the B-shell surface is separated from the C-shell surface.

For example, the capacitance value of each location point in the second region is compared with a capacitance threshold, and it is determined, based on a comparison result, whether the B-shell surface is separated from the C-shell surface. In some embodiments, if the capacitance values of all the location points in the second region are below the capacitance threshold, it is determined that the B-shell surface is separated from the C-shell surface. In other embodiments, it is determined that the B-shell surface is separated from the C-shell surface if an average value of the capacitance values of all the location points in the second region is less than the capacitance threshold.

In some embodiments, whether the B-shell surface is separated from the C-shell surface may be further determined based on existence duration of the second region. For example, in a case in which the existence duration of the second region does not exceed the preset duration, it is determined that the B-shell surface is separated from the C-shell surface.

Certainly, in the foregoing illustrated embodiment, whether the B-shell surface and the C-shell surface are separated is determined based on any attribute information of the second region. In another possible embodiment, to improve accuracy of determining, a plurality of pieces of attribute information of the second region may be combined, to determine whether the B-shell surface and the C-shell surface are separated.

In this way, even in a process in which the user opens the notebook computer, contact between a hand and the touch panel does not affect determining of "whether the B-shell surface and the C-shell surface are separated". The accuracy of identifying whether the B-shell surface and the C-shell surface are separated is improved.

S203: If it is determined that the B-shell surface is separated from the C-shell surface, control the display to turn on.

In this embodiment of this application, the display is controlled to change from off to on. In this way, turning on the screen upon opening of the cover of the notebook computer is implemented. Experience of interaction between the notebook computer and the user is enhanced.

In some embodiments, S202 and S203 may also be understood as determining whether the second region meets the first predetermined condition. When it is determined that the second region does not meet the first predetermined condition, the display is controlled to be on.

Similarly, the first predetermined condition may include one or a combination of more of the following determining conditions: "an area ratio of the second region to the detection region exceeds a first ratio", "a capacitance value corresponding to the second region is not less than a capacitance threshold", and "existence duration of the second region exceeds preset duration". When the first predetermined condition is a combination of at least two determining conditions, it is determined, if any determining condition is not met, that the second region does not meet the first predetermined condition. When all corresponding determining conditions are met, it is determined that the second region meets the first predetermined condition.

In the foregoing embodiment, whether to control the display to be on is determined based on the second region. Actually, in another embodiment, whether to control the display to turn on may also be determined by using another region (that is, a contactless region) other than the first region. The contactless region includes a location point at which a difference between a capacitance value in the detection region and a normal value does not exceed a preset threshold 1.

In another possible embodiment, in a process of turning on the screen upon opening of the cover, the contactless region may be further determined based on a location point at which a capacitance value changes on the touch panel. That is, in this embodiment, the contactless region includes all location points at which capacitance values on the lower panel are reduced at the same time.

For example, capacitance information of the panel may be obtained by using the touch chip on a frame-by-frame basis. Capacitance information of each frame includes capacitance values of all location points on the lower panel at the same moment. Therefore, the collected capacitance information of the current frame may be compared with capacitance information of a previous adjacent frame. For example, first, a second location point is determined on the panel based on the capacitance information of the current frame and the capacitance information of the previous adjacent frame, that is, a location point at which a capacitance value changes is determined. Second, a current capacitance value corresponding to the second location point is obtained from the capacitance information of the current frame, and a capacitance value corresponding to the second location point at a previous adjacent moment is obtained from the capacitance information of the previous adjacent frame. Then, a capacitance difference 2 between the current capacitance value and the capacitance value at the previous adjacent moment is determined. If the capacitance difference 2 exceeds the preset threshold 2, it is determined that the capacitance value on the panel decreases, that is, the capacitance value of the display changes. Finally, the contactless region is obtained based on all the first location points at which the capacitance values decrease, that is, a region that includes the first location points at which the capacitance values decrease.

For example, whether the contactless region meets a second predetermined condition may be determined. When the contactless region does not meet the second predetermined condition, the display is controlled to turn on. The second predetermined condition may be that an area ratio of the contactless region to the detection region does not exceed the first ratio.

In another embodiment of this application, after the notebook computer enters a closed-cover state from an open-cover state, the touch chip suspends refreshing of the capacitance value on the panel, that is, pauses to obtain the capacitance information of the detection region. The touch chip restarts to refresh the capacitance information of the detection region, that is, restarts to obtain the capacitance information of the detection region when a cover opening operation (that is, a first operation) of the user is received. In this way, within a first time period after the notebook computer enters the screen-off state (that is, a time period between a moment of screen off and a moment of receiving the cover opening operation), the touch chip stops refreshing capacitance information of the panel, so as to avoid unnecessary energy consumption when the notebook computer is in the closed-cover state for a long time.

The foregoing cover opening operation is an operation in which the user intends to separate the B-shell surface and the C-shell surface of the notebook computer.

In some embodiments, when the user separates the B-shell surface from the C-shell surface of the notebook computer, a structure of the notebook computer sounds, which is also referred to as a cover opening sound. For example, the notebook computer has a locking part. The locking part is configured to keep the upper cover (on the side on which the B-shell surface is disposed) and the lower cover (on the side on which the C-shell surface is disposed) of the notebook computer in a fastened state. If the user wants to separate the upper cover and the lower cover, the locking part needs to be opened first to release locking of the fastened state between the upper cover and the lower cover. When the locking part is opened, the locking part makes a sound, and the sound may be considered as a cover opening sound. For another example, the upper cover and the lower cover of the notebook computer are connected by using a spindle. To separate the upper cover from the lower cover, the upper cover and the lower cover need to rotate around the spindle. During rotation around the spindle, a sound is also generated, and the sound may also be considered as a cover opening sound.

Therefore, it may be determined, by identifying the sound generated by the notebook computer, whether the user performs the cover opening operation. Therefore, when determining that the user performs the cover opening operation, obtaining a capacitance value change in the detection region based on the first frame rate is restarted.

Figure 9:
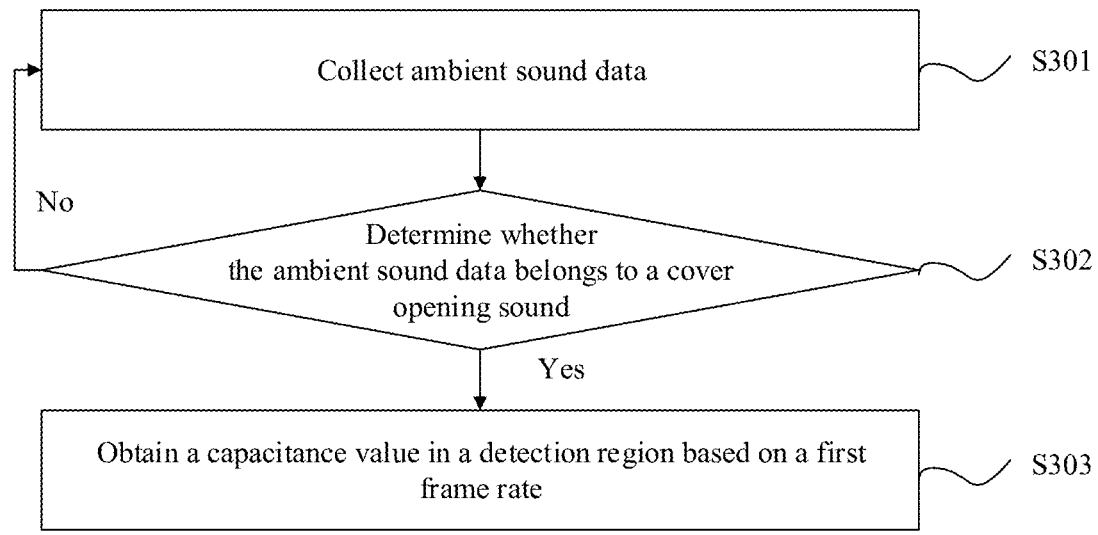
FIG. 9 is first part of a flowchart of steps of a display control method according to an embodiment of this application.

In other words, when the foregoing display control method is applied to a notebook computer in a closed-cover state, on the basis of FIG. 8, as shown in FIG. 9, the foregoing display control method further includes the following steps.

S301: Collect ambient sound data.

In some embodiments, the notebook computer has a microphone, which can collect ambient sound data in real time.

In other embodiments, when the notebook computer is in an open-cover state, the microphone is in a low energy consumption mode (for example, stops collecting ambient sound data). After it is recognized that the notebook computer is in the closed-cover state, the microphone automatically enters a working mode of collecting ambient sound data in real time. Therefore, an energy saving effect is achieved.

S302: Determine whether the ambient sound data belongs to a cover opening sound.

In some embodiments, the ambient sound data is complex, and the collected ambient sound data may be identified by using a sound recognition model, so as to determine whether the ambient sound data belongs to a cover opening sound.

The voice recognition model may be obtained through pre-training. For example, a process of pre-training a sound recognition model is as follows:

First, sound training samples are obtained. The sound training samples include a cover open sound sample and a non-cover-open sound sample. Each sound training sample has a sample label, and the sample label is used to distinguish whether the sound training sample belongs to a cover open sound sample or belongs to a non-cover-open sound sample.

Then, the sound training sample is input into a pre-selected neural network model. The neural network model is iterated by using a classification result of a sound training sample and a sample label of the sound training sample to obtain a sound recognition model.

After the pre-trained sound recognition model is configured on the notebook computer, the ambient sound data collected by the notebook computer may be identified by using the sound recognition model, so as to determine whether the collected ambient sound data is a cover opening sound.

Certainly, pre-training has limited recognition accuracy improvement on the sound recognition model. To enable the sound recognition model to more accurately identify an actual cover opening sound of the notebook computer, the actual open cover sound of the notebook computer may be collected to continue to iteratively update the sound recognition model.

For example, in an iterative time period after the sound recognition model is configured to the notebook computer, any ambient sound data collected by the notebook computer triggers restart to obtain, based on the first frame rate, a capacitance value change in the detection region. If it is determined, based on the capacitance value in the detection region, that the B-shell surface and the C-shell surface are not separated, a sample label 1 is assigned to the ambient sound data, and the sample label 1 is used to indicate that the ambient sound data does not belong to the cover opening sound. If it is determined, based on the capacitance value in the detection region, that the B-shell surface and the C-shell surface are separated, a sample label 2 is assigned to the ambient sound data, and the sample label 2 is used to indicate that the ambient sound data belongs to the cover opening sound. Thus, a new training sample is collected. The new training sample better fits the actual situation of the notebook computer that is configured. The voice recognition model is further iterated by using the new training sample to enhance a recognition capability of the iterated voice recognition model.

In addition, after the iteration period, each piece of collected ambient sound data is input into the sound recognition model, to determine whether the ambient sound data is a cover opening sound.

S303: If the ambient sound belongs to the cover opening sound, obtain a capacitance value in the detection region based on the first frame rate.

In this way, when it is detected that the capacitance value changes, the procedure can enter S201.

In other embodiments, in a case in which a change in a capacitance value is not detected for a long time, the foregoing method may further include: stopping obtaining a capacitance value in the detection region. Therefore, invalid panel capacitance detection is avoided, and energy consumption is reduced. For example, within preset duration (for example, one minute) after capacitance value detection is restarted, a capacitance value change in the detection region is not detected, and the capacitance value in the detection region is stopped to continue to be obtained.

In addition, even if a capacitance value change is detected, but it is determined, by using S201 and S202, that the C-shell surface and the B-shell surface are not separated, the capacitance value in the detection region is stopped to continue to be obtained.

In summary, in the foregoing embodiment, a cover opening sound is used as a trigger condition, and by determining the cover opening sound, a capacitance value of the detection region is triggered to be obtained. The capacitance value change in the detection region is prevent from being continuously monitored after the cover of the notebook computer is closed, so as to reduce energy consumption.

Certainly, in a process of implementing the method provided in this embodiment of this application, another trigger condition may be used to trigger starting to obtain a capacitance value of the detection region.

For another example, in a process in which the user separates the B-shell surface from the C-shell surface of the notebook computer, the upper cover of the notebook rotates relative to the lower cover. Essentially, the upper cover is circumferentially moved around the spindle. Therefore, a circumferential motion of the upper cover may be used as a trigger condition.

That is, in some embodiments, in a case in which a circumferential movement is performed on the upper cover, it is determined that the user performs a cover opening operation. The restart is triggered to obtain, based on the first frame rate, a capacitance value change in the detection region.

Figure 10:
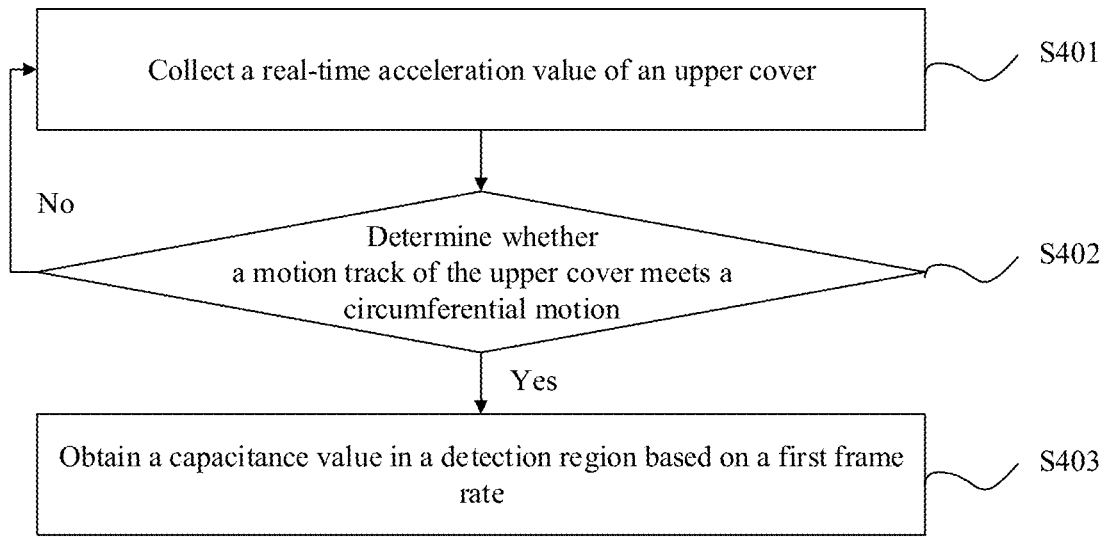
FIG. 10 is a second part of a flowchart of steps of a display control method according to an embodiment of this application.

For example, an acceleration sensor is disposed on the upper cover of the notebook computer. When the foregoing display control method is applied to the notebook computer in a closed-cover state, on the basis of FIG. 8, as shown in FIG. 10, the foregoing display control method further includes the following steps.

S401: Collect a real-time acceleration value of the upper cover.

In some embodiments, acceleration collection may be performed in real time by using the acceleration sensor to obtain a real-time acceleration value. In some embodiments, the acceleration sensor may be disposed on a side that is of the upper cover and away from the spindle.

In some embodiments, when the notebook computer is in an open-cover state, the acceleration sensor is in a low energy consumption mode (for example, stops collecting a real-time acceleration value). After it is recognized that the notebook computer is in the closed-cover state, the acceleration sensor automatically enters a working mode of real-time collection. Therefore, an energy saving effect is achieved.

S402: Determine, based on the real-time acceleration value, whether a motion track of the upper cover meets a circumferential motion.

S403: When the motion track of the upper cover meets a circumferential motion, obtain a capacitance value in the detection region based on the first frame rate.

Similarly, when a change in a capacitance value is detected, the procedure may enter S201. However, after the procedure enters S201, if it is determined, by using S201 and S202, that the C-shell surface is not separated from the B-shell surface, the capacitive value in the detection region stops to continue to be obtained, so as to wait for a next restart detection to be triggered.

In addition, in a case in which a change in a capacitance value is not detected for a long time, the foregoing method may further include: stopping continuing to obtain a capacitance value in the detection region, so as to wait for next restart detection to be triggered.

For another example, in a process in which the user separates the B-shell surface from the C-shell surface of the notebook computer, residual vibration exists in the cover after the user stops performing the cover opening operation due to movement inertia. Therefore, a sway frequency and amplitude of the upper cover of the notebook computer may be further used as a trigger condition to determine whether the user performs the cover opening operation. Therefore, when determining that the user performs the cover opening operation, obtaining a capacitance value change in the detection region based on the first frame rate is restarted.

Figure 11:
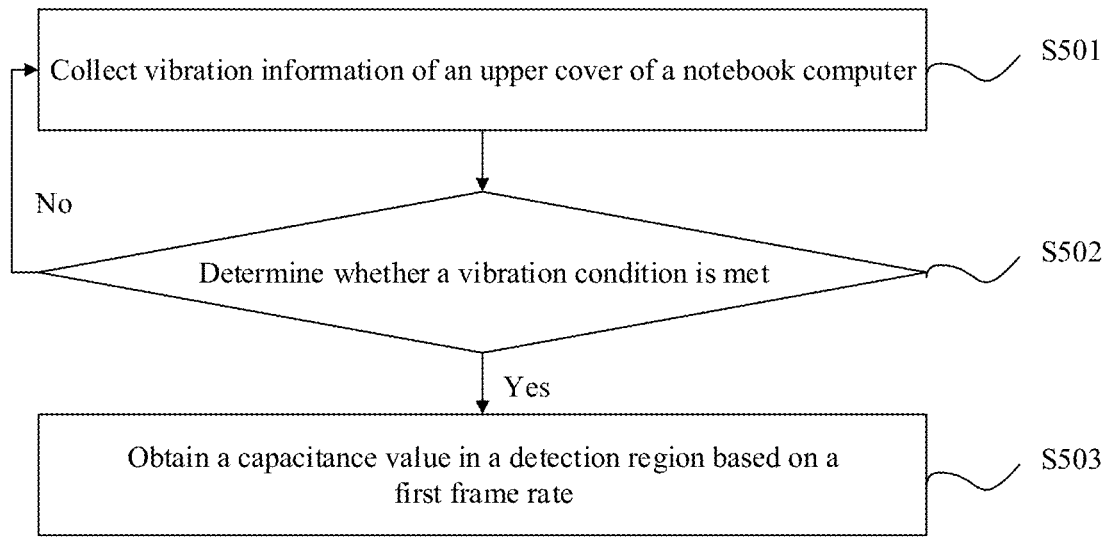
FIG. 11 is a third part of a flowchart of steps of a display control method according to an embodiment of this application.

For example, a vibration sensor is disposed on the upper cover of the notebook computer. When the foregoing display control method is applied to the notebook computer in a closed-cover state, on the basis of FIG. 8, as shown in FIG. 11, the foregoing display control method further includes the following steps.

S501: Collect vibration information of the upper cover of the notebook computer, for example, a vibration frequency and a vibration amplitude.

In some embodiments, the vibration frequency and vibration amplitude of the upper cover may be collected in real time by using the vibration sensor.

In some embodiments, when the notebook computer is in an open-cover state, the foregoing vibration sensor is in a low energy consumption mode (for example, stops collecting vibration information). After it is recognized that the notebook computer is in the closed-cover state, the vibration sensor automatically enters a working mode of real-time collection. Therefore, an energy saving effect is achieved.

S502: Determine, based on the collected vibration frequency and amplitude, whether the vibration condition is met.

In some embodiments, the above-mentioned vibration conditions include a vibration frequency threshold and a vibration amplitude threshold. When the collected vibration frequency reaches the vibration frequency threshold and/or the collected vibration amplitude reaches the vibration amplitude threshold, it is determined that the vibration condition is met.

S503: When the vibration condition is met, obtain a capacitance value in the detection region based on the first frame rate.

Similarly, when a change in a capacitance value is detected, the procedure may enter S201. However, if it is determined, by using S201 and S202, that the C-shell surface is not separated from the B-shell surface, obtaining of the capacitance value in the detection region is also stopped.

In addition, in a case in which a change in a capacitance value is not detected for a long time, the foregoing method may further include: stopping continuing to obtain a capacitance value in the detection region.

In other embodiments, separation of the B-shell surface and the C-shell surface also means that the shielded content detected by a TOF sensor is eliminated for the notebook computer with the TOF sensor. By using this mechanism, it may be determined, based on a detection result of the TOF sensor, whether the user performs the cover opening operation. Therefore, when determining that the user performs the cover opening operation, obtaining a capacitance value change in the detection region based on the first frame rate is restarted.

Figure 12:
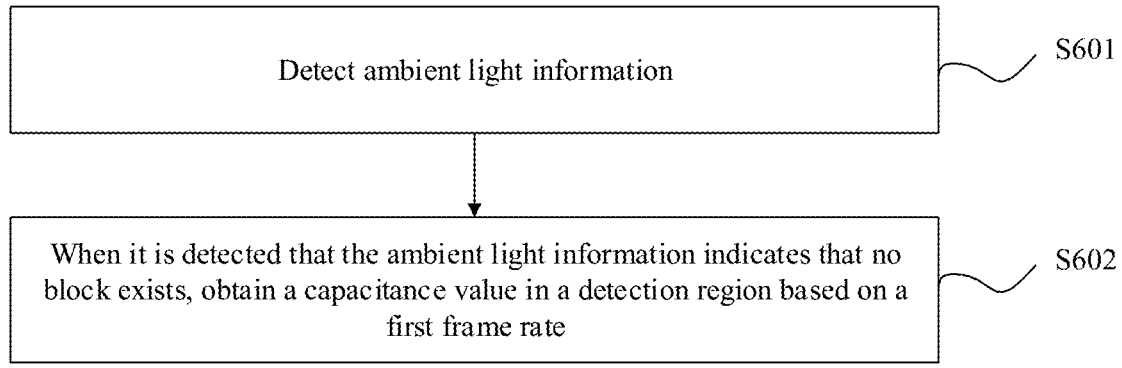
FIG. 12 is a fourth part of a flowchart of steps of a display control method according to an embodiment of this application.

In other words, when the foregoing display control method is applied to a notebook computer in a closed-cover state, on the basis of FIG. 8, as shown in FIG. 12, the foregoing display control method further includes the following steps.

S601: Detect ambient light information.

In some embodiments, a TOF sensor may be disposed on the B-shell surface. When the TOF sensor detects ambient light, it is determined that the B-shell surface is not shielded, that is, the touch panel is not shielded. When the TOF sensor detects no ambient light, it is determined that the B-shell surface is shielded, that is, the touch panel is shielded.

S602: When it is detected that the ambient light information indicates that no block exists, obtain a capacitance value in the detection region based on the first frame rate.

The above-mentioned absence of blocking means that an installation position of the TOF sensor is not blocked from light.

In some embodiments, when the collected ambient light information exceeds a light threshold, it indicates that no block exists.

In addition, when it is detected that the capacitance value changes, the procedure can enter S201. However, if it is determined, by using S201 and S202, that the C-shell surface is not separated from the B-shell surface, obtaining of the capacitance value in the detection region is also stopped.

In addition, in a case in which a change in a capacitance value is not detected for a long time, the foregoing method may further include: stopping continuing to obtain a capacitance value in the detection region.

In the foregoing embodiment, a sound, a motion track of the upper cover, a vibration condition of the upper cover, or a light shielding condition is separately used to determine whether to enable obtaining a capacitance value change in the detection region based on the first frame rate. In an actual use process, it may also be determined, with reference to at least two of a sound, a motion track of the upper cover, a vibration condition of the upper cover, and a light shielding condition, whether to start to obtain a capacitance value change in the detection region based on the first frame rate.

For example, when it is determined that the collected ambient sound belongs to the cover opening sound, the acceleration sensor may be started to perform acceleration collection in real time. It is determined, based on the collected real-time acceleration value, whether a motion track of the upper cover meets a circumferential motion. When it is determined that the motion track of the upper cover matches the circumferential motion, the vibration sensor is started to collect a vibration frequency and a vibration amplitude of the upper cover in real time. It is determined whether the vibration condition is met based on the collected vibration frequency and amplitude. When it is determined that the vibration condition is met, the TOF sensor is triggered to collect ambient light. When the TOF sensor detects ambient light, it is determined that the B surface is not shielded. When it is determined that the B-shell surface is not shielded, obtaining a capacitance value change in the detection region based on the first frame rate is started.

For another example, when it is determined that the collected ambient sound belongs to the cover opening sound, the TOF sensor may be triggered to collect ambient light. When the TOF sensor detects ambient light, the acceleration sensor is started to collect acceleration in real time. Then, it is determined, based on the collected real-time acceleration value, whether the motion track of the upper cover meets the circumferential motion. When it is determined that the motion track of the upper cover matches the circumferential motion, the vibration sensor is started to collect a vibration frequency and a vibration amplitude of the upper cover in real time. It is determined whether the vibration condition is met based on the collected vibration frequency and amplitude. When it is determined that the vibration condition is met, obtaining a capacitance value change in the detection region based on the first frame rate is started.

As shown above, according to the display control method provided in this embodiment of this application, accuracy of determining whether the display is fastened to the first surface is improved by monitoring a change of a capacitance value on the display with reference to an anti-error determining policy, and accuracy of screen control is improved. In addition, a working mode of each component (for example, the display, the microphone, and the acceleration sensor) in the notebook computer may be flexibly adjusted in different scenarios. For example, the frame rate of the display is adjusted based on a scenario (that is, a frame rate at which the display detects a capacitance change condition on the panel). For another example, the microphone, the acceleration sensor, and the like are enabled to work in a period in which the cover of the notebook computer is closed. When the cover of the notebook computer is opened, the microphone, the acceleration sensor, and the like are controlled to enter a sleep mode. Therefore, energy saving is achieved.

An embodiment of this application further provides an electronic device, and the electronic device may include a display, a memory, and one or more processors. The display, the memory, and the processor are coupled. Certainly, the electronic device includes but is not limited to the foregoing display, memory, and one or more processors. For example, for a structure of the electronic device, refer to the structure of the mobile phone shown in FIG. 4. The memory is configured to store computer program code, and the computer program code includes computer instructions. When the instructions are executed by the processor, the electronic device can perform steps executed by the mobile phone in the foregoing embodiments.

For example, the foregoing one or more processors are configured to obtain capacitance values of a detection region of a touch panel, where a location point at which a difference between a capacitance value in the detection region and a first value exceeds a first preset threshold is a contact region, and a location point at which a difference between a capacitance value in the detection region and the first value does not exceed the first preset threshold is a contactless region. The foregoing one or more processors are further configured to: when the contact region meets a first predetermined condition or the contactless region meets a second predetermined condition, control the display to turn off. The foregoing one or more processors are further configured to: when the contactless region does not meet the second predetermined condition or the contact region does not meet the first predetermined condition, control the display to turn on.

The first predetermined condition includes one or a combination of more of the following: An area ratio of the contact region to the detection region exceeds a first ratio; a capacitance value corresponding to the contact region is not less than a capacitance threshold; and existence duration of the contact region exceeds preset duration.

The second predetermined condition includes: An area ratio of the contactless region to the detection region does not exceed the first ratio.

In some possible embodiments, the detection region determined by the electronic device is all or a part of the area in the touch panel.

In some possible embodiments, after the display is controlled to turn off, the foregoing one or more processors are further configured to obtain a capacitance value of the detection region by using a first frame rate. The first frame rate is lower than a second frame rate. The second frame rate is a refresh frame rate of the touch panel when the display is on.

In some possible embodiments, after the display is controlled to turn off, the foregoing one or more processors are further configured to suspend detection of a capacitance value of the touch panel within a first time period, where the first time period is a time period between a moment at which the display turns off and a moment of receiving a first operation of a user.

In some possible embodiments, the electronic device includes a microphone. The microphone is configured to collect ambient sound data.

The foregoing one or more processors are further configured to: when the ambient sound data is a cover opening sound of the electronic device, determine that the first operation is received.

The foregoing one or more processors are further configured to: when it is determined that the first operation is received, continue to detect a capacitance value of the detection region.

In some possible embodiments, the microphone is configured to stop collecting the ambient sound data when the display is on.

The microphone is further configured to: when the display changes from on to off, continue to collect the ambient sound data.

In some possible embodiments, the electronic device includes an upper cover and an acceleration sensor. The acceleration sensor is disposed on the upper cover.

The acceleration sensor is configured to collect a real-time acceleration value of the upper cover.

The foregoing one or more processors are further configured to: when the real-time acceleration value indicates that a motion track of the upper cover conforms to a circumferential motion, determine that the first operation is received.

The foregoing one or more processors are further configured to: when it is determined that the first operation is received, continue to detect a capacitance value of the detection region.

In some possible embodiments, the acceleration sensor is further configured to: when the display is on, stop collecting the real-time acceleration value.

The acceleration sensor is further configured to: when the display changes from on to off, continue to collect the real-time acceleration value.

In some possible embodiments, the electronic device includes an upper cover and a vibration sensor. The vibration sensor is disposed on the upper cover.

The vibration sensor is configured to collect vibration information of the upper cover.

The foregoing one or more processors are further configured to: when the vibration information indicates that the upper cover meets a vibration condition, determine that the first operation is received.

The foregoing one or more processors are further configured to: when it is determined that the first operation is received, continue to detect a capacitance value of the detection region.

In some possible embodiments, the vibration sensor is further configured to: when the display is on, stop collecting the vibration information.

The vibration sensor is further configured to: when the display changes from on to off, continue to collect the vibration information.

In some possible embodiments, the electronic device includes a time of flight TOF sensor.

The TOF sensor is configured to detect ambient light information.

The foregoing one or more processors are further configured to: when the ambient light information indicates that an installation position of the TOF sensor is not blocked, determine that the first operation is received.

The foregoing one or more processors are further configured to: when it is determined that the first operation is received, continue to detect a capacitance value of the touch panel.

As shown above, according to the electronic device provided in this embodiment of this application, accuracy of determining whether the display is fastened to the first surface is improved by monitoring a change of a capacitance value on the display with reference to an anti-error determining policy, and accuracy of screen control is improved. In addition, a working mode of each component (for example, the display, the microphone, and the acceleration sensor) in the electronic device may be flexibly adjusted in different scenarios. For example, the frame rate of the display is adjusted based on a scenario (that is, a frame rate at which the display detects a capacitance change condition on the panel). For another example, the microphone, the acceleration sensor, and the like are enabled to work in a period in which the cover of the electronic device is closed. When the cover of the electronic device is opened, the microphone, the acceleration sensor, and the like are controlled to enter a sleep mode. Therefore, energy saving is achieved.

Figure 13:
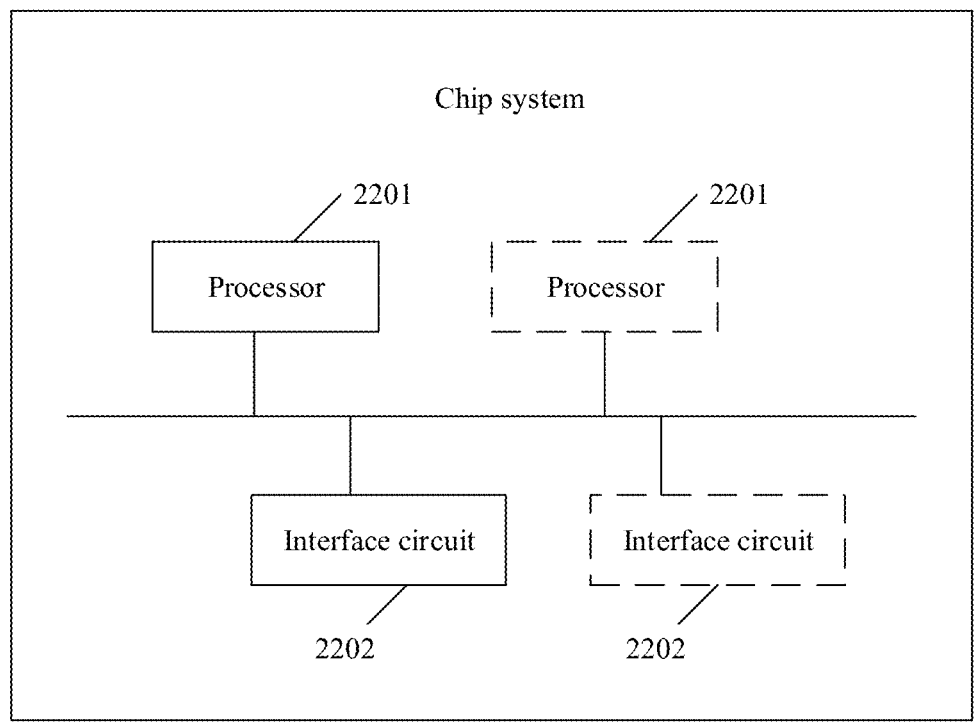
FIG. 13 is a schematic diagram of composition of a chip system according to an embodiment of this application.

An embodiment of this application further provides a chip system, and the chip system may be applied to the electronic device in the foregoing embodiment. As shown in FIG. 13, the chip system includes at least one processor 2201 and at least one interface circuit 2202. The processor 2201 may be the processor in the foregoing electronic device. The processor 2201 and the interface circuit 2202 may be interconnected through a line. The processor 2201 may receive and execute a computer instruction from the memory of the foregoing electronic device by using the interface circuit 2202. When the computer instruction is executed by the processor 2201, the electronic device can perform steps executed by the mobile phone in the foregoing embodiments. Certainly, the chip system may further include another discrete component. This is not specifically limited in this embodiment of this application.

It may be clearly understood by a person skilled in the art from the foregoing description of the implementations that, for convenience and brevity of the description, division of the foregoing functional modules is merely used as an example for description. In actual application, the foregoing functions may be allocated to different functional modules based on a requirement, that is, an internal structure of the apparatus is divided into different functional modules, so as to complete all or some of the functions described above. For a specific working process of the foregoing system, apparatus, and unit, refer to a corresponding process in the foregoing method embodiment. Details are not described herein again.

Functional units in the embodiments of this application may be integrated into one processing unit, each of the units may exist alone physically, or two or more units are integrated into one unit. The foregoing integrated unit may be implemented in a form of hardware, or may be implemented in a form of a software functional unit.

When an integrated unit is implemented in a form of a software functional unit and sold or used as an independent product, the integrated unit may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

In addition, terms "first" and "second" are merely used for description purposes, and shall not be understood as an indication or implication of relative importance or implicitly indicate the number of indicated technical features. Therefore, a feature defined as "first" or "second" may explicitly or implicitly include one or more of the features. In the description of the embodiments, unless otherwise stated, "a plurality of" means two or more.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A display control method, applied to an electronic device comprising a microphone, a lower cover, and an upper cover including an acceleration sensor and a display having a touch panel, and the method comprises:
   obtaining capacitance values of a detection region of the touch panel, wherein a location point at which a difference between a capacitance value in the detection region and a first value exceeds a first preset threshold is a contact region, and a location point at which a difference between a capacitance value in the detection region and the first value does not exceed the first preset threshold is a contactless region;
   when the contact region meets a first predetermined condition or the contactless region meets a second predetermined condition, controlling the display to turn off, controlling the microphone to collect ambient sound data, and controlling the acceleration sensor to collect real-time acceleration values of the upper cover, wherein after controlling the display to turn off:
      suspending detection of capacitance values of the touch panel,
      continuing detection of the capacitance values of the touch panel when the real-time acceleration values indicate that a motion track of the upper cover conforms to a circumferential motion, and
      continuing detection of the capacitance values of the detection region of the touch panel when the ambient sound data is a cover opening sound, wherein the cover opening sound corresponds to an operation utilized in separating the upper cover and the lower cover; and
   when the contactless region does not meet the second predetermined condition or the contact region does not meet the first predetermined condition, controlling the display to turn on, controlling the microphone to stop collecting the ambient sound data, and controlling the acceleration sensor to stop collecting the real-time acceleration values when the display is on.

2. The display control method according to claim 1, wherein the first predetermined condition comprises at least one of the following:
   an area ratio of the contact region to the detection region exceeds a first ratio;
   a capacitance value corresponding to the contact region is not less than a capacitance threshold; and
   existence duration of the contact region exceeds preset duration.

3. The display control method according to claim 1, wherein the second predetermined condition comprises:
   an area ratio of the contactless region to the detection region does not exceed a first ratio.

4. The display control method according to claim 1, wherein the detection region is all or a part of the touch panel.

5. The display control method according to claim 1, wherein after the controlling the display to turn off, the method further comprises:
   obtaining a capacitance value of the detection region by using a first frame rate, wherein the first frame rate is lower than a second frame rate, and wherein the second frame rate is a refresh frame rate of the touch panel when the display is on.

6. The display control method according to claim 1, wherein the electronic device comprises a vibration sensor disposed on the upper cover, and the method comprises:
   collecting vibration information of the upper cover by using the vibration sensor when the display is off; and
   when the vibration information indicates that the upper cover meets a vibration condition, continuing to detect capacitance values of the detection region.

7. The display control method according to claim 6, wherein the method comprises:
   when the display is on, controlling the vibration sensor to stop collecting the vibration information; and
   when the display changes from on to off, controlling the vibration sensor to continue to collect the vibration information.

8. The display control method according to claim 1, wherein the electronic device comprises a time of flight (TOF) sensor, and the method comprises:
   detecting ambient light information by using the TOF sensor when the display is off; and
   when the ambient light information indicates that an installation position of the TOF sensor is not blocked continuing to detect capacitance values of the touch panel.

9. The display control method according to claim 1, wherein the display of the electronic device is a foldable screen.

10. An electronic device, comprising:
   a microphone;
   a lower cover;
   an upper cover including an acceleration sensor and a display having a touch panel;
   one or more processors; and
   one or more storage devices storing instructions that are operable, when executed by the one or more processors, to cause the one or more processors to perform operations comprising:
      obtaining capacitance values of a detection region of the touch panel, wherein a location point at which a difference between a capacitance value in the detection region and a first value exceeds a first preset threshold is a contact region, and a location point at which a difference between a capacitance value in the detection region and the first value does not exceed the first preset threshold is a contactless region;
      when the contact region meets a first predetermined condition or the contactless region meets a second predetermined condition, controlling the display to turn off, controlling the microphone to collect ambient sound data, and controlling the acceleration sensor to collect real-time acceleration values of the upper cover, wherein after controlling the display to turn off:
         suspending detection of capacitance values of the touch panel,
         continuing detection of the capacitance values of the touch panel when the real-time acceleration values indicate that a motion track of the upper cover conforms to a circumferential motion, and
         continuing detection of the capacitance values of the detection region of the touch panel when the ambient sound data is a cover opening sound, wherein the cover opening sound corresponds to an operation utilized in separating the upper cover and the lower cover; and
      when the contactless region does not meet the second predetermined condition or the contact region does not meet the first predetermined condition, controlling the display to turn on, controlling the microphone to stop collecting the ambient sound data, and controlling the acceleration sensor to stop collecting the real-time acceleration values when the display is on.

11. The electronic device according to claim 10, wherein the first predetermined condition comprises at least one of the following:
   an area ratio of the contact region to the detection region exceeds a first ratio;
   a capacitance value corresponding to the contact region is not less than a capacitance threshold; and
   existence duration of the contact region exceeds preset duration.

12. The electronic device according to claim 10, wherein the second predetermined condition comprises:
   an area ratio of the contactless region to the detection region does not exceed a first ratio.

13. The electronic device according to claim 10, wherein the detection region is all or a part of the touch panel.

14. The electronic device according to claim 10, wherein after the controlling the display to turn off, the operations further comprises:
   obtaining a capacitance value of the detection region by using a first frame rate, wherein the first frame rate is lower than a second frame rate, and wherein the second frame rate is a refresh frame rate of the touch panel when the display is on.

15. A computer storage medium, wherein computer readable storage medium stores instructions, which, when executed on an electronic device, cause the electronic device to perform operations for display controlling, wherein the electronic device comprises a microphone, a lower cover, and an upper cover including an acceleration sensor and a display having a touch panel, and the operations comprising:
   obtaining capacitance values of a detection region of the touch panel, wherein a location point at which a difference between a capacitance value in the detection region and a first value exceeds a first preset threshold is a contact region, and a location point at which a difference between a capacitance value in the detection region and the first value does not exceed the first preset threshold is a contactless region;
   when the contact region meets a first predetermined condition or the contactless region meets a second predetermined condition, controlling the display to turn off, controlling the microphone to collect ambient sound data, and controlling the acceleration sensor to collect real-time acceleration values of the upper cover, wherein after controlling the display to turn off:
   suspending detection of capacitance values of the touch panel,
   continuing detection of the capacitance values of the touch panel when the real-time acceleration values indicate that a motion track of the upper cover conforms to a circumferential motion, and
   continuing detection of the capacitance values of the detection region of the touch panel when the ambient sound data is a cover opening sound, wherein the cover opening sound corresponds to an operation utilized in separating the upper cover and the lower cover; and
   when the contactless region does not meet the second predetermined condition or the contact region does not meet the first predetermined condition, controlling the display to turn on, controlling the microphone to stop collecting the ambient sound data, and controlling the acceleration sensor to stop collecting the real-time acceleration values when the display is on.

16. The computer storage medium according to claim 15, wherein the first predetermined condition comprises at least one of the following:
   an area ratio of the contact region to the detection region exceeds a first ratio;
   a capacitance value corresponding to the contact region is not less than a capacitance threshold; and
   existence duration of the contact region exceeds preset duration.

17. The computer storage medium according to claim 15, wherein the second predetermined condition comprises:
   an area ratio of the contactless region to the detection region does not exceed a first ratio.

18. The computer storage medium according to claim 15, wherein the detection region is all or a part of the touch panel.

19. The computer storage medium according to claim 15, wherein the electronic device comprises a time of flight (TOF) sensor, and the operations further comprising:
   detecting ambient light information by using the TOF sensor when the display is off; and
   when the ambient light information indicates that an installation position of the TOF sensor is not blocked continue to detect capacitance values of the touch panel.

20. The computer storage medium according to claim 15, the operations further comprising:
   obtaining, after the controlling the display to turn off, a capacitance value of the detection region by using a first frame rate, wherein the first frame rate is lower than a second frame rate, and wherein the second frame rate is a refresh frame rate of the touch panel when the display is on.

* * * * *